US007496852B2

(12) United States Patent
Eichorn et al.

(10) Patent No.: US 7,496,852 B2
(45) Date of Patent: Feb. 24, 2009

(54) GRAPHICALLY MANIPULATING A DATABASE

(75) Inventors: Lisa S. Eichorn, Wake Forest, NC (US); Jon M. Harris, Raleigh, NC (US); Wilbert R. Joyner, Jr., Durham, NC (US); Jessica J. Peter, Apex, NC (US); Zhong Qianjie, Shanghai (CN); Tyler A. Walters, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 11/435,330

(22) Filed: May 16, 2006

(65) Prior Publication Data
US 2007/0271285 A1    Nov. 22, 2007

(51) Int. Cl.
*G06F 3/048* (2006.01)
*G06F 7/00* (2006.01)

(52) U.S. Cl. .................. 715/764; 715/767; 715/769; 715/772; 715/800; 707/101

(58) Field of Classification Search ............ 707/10, 707/101–102; 717/156; 715/212, 215, 219, 715/227–228, 273, 514; 705/9
See application file for complete search history.

(56) References Cited

U.S. PATENT DOCUMENTS

| | | | | |
|---|---|---|---|---|
| 5,093,907 A | * | 3/1992 | Hwong et al. | ............... 345/473 |
| 5,255,363 A | * | 10/1993 | Seyler | ................... 715/219 |
| 5,553,212 A | * | 9/1996 | Etoh et al. | .............. 345/440 |
| 5,581,677 A | * | 12/1996 | Myers et al. | ............. 345/440 |
| 5,727,161 A | | 3/1998 | Purcell, Jr. | |
| 5,752,246 A | * | 5/1998 | Rogers et al. | ............. 707/10 |
| 6,313,833 B1 | | 11/2001 | Knight | |
| 6,529,217 B1 | * | 3/2003 | Maguire, III et al. | ........ 715/769 |
| 6,590,577 B1 | * | 7/2003 | Yonts | ................... 345/440 |
| 2002/0085036 A1 | * | 7/2002 | Nakatani | ................ 345/764 |
| 2004/0138933 A1 | | 7/2004 | LaComb et al. | |
| 2004/0193473 A1 | * | 9/2004 | Robertson et al. | ............. 705/9 |
| 2005/0060647 A1 | * | 3/2005 | Doan et al. | ................ 715/514 |
| 2005/0209948 A1 | | 9/2005 | Ballow et al. | |
| 2005/0246213 A1 | | 11/2005 | Vacante et al. | |

OTHER PUBLICATIONS

Marchese F., Teaching Computer Graphics with Spreadsheets, Jul. 1998, ACM, pp. 84-87.*
Woo et al., A Spreadsheet Approach to Programming and Managing Sensor Networks, Apr. 2006, ACM, pp. 424-431.*

* cited by examiner

*Primary Examiner*—Apu M Mofiz
*Assistant Examiner*—Jessica N Le
(74) *Attorney, Agent, or Firm*—Martin J. McKinley; Law Office of Jim Boice

(57) ABSTRACT

A method and system for managing a database through a graphical representation is presented. The method the method includes dynamically adjusting data in a database by graphically manipulating a graph that represents the database. In one embodiment, a predictive cone is overlaid onto the graph. The predictive cone is created from a heuristic algorithm that uses past historical data to predict where future real data will track on the graph.

3 Claims, 29 Drawing Sheets

GRAPHICALLY MANIPULATING A DATABASE

BACKGROUND OF THE INVENTION

The present invention relates in general to the field of computers and similar technologies, and in particular to software utilized in this field.

An important part of monitoring business strategy is the setting and monitoring of business targets. Typically, business targets are set in a relational database such as a spreadsheet, which allows target data to be input into cells in the spreadsheet. Because of the labor intensive nature of manually entering target values into the cells, the process of defining targets is arduous and time consuming, making it difficult to manage, and therefore difficult to properly execute, an enterprise's business strategy.

Similarly, tracking business targets over time is an important aspect of managing a businesses strategy. Such tracking is typically performed with the aid of graphs, which are created/populated from data in a spreadsheet. While such tracking allows a snapshot of a track for a target, there is currently no easy way to modify the graph without going back to the underlying spreadsheet and entering new data. Furthermore, overlaying a graph of actual values (values representing historical figures of what the enterprise has accomplished to date) with a graph of the business targets may not help a manager see where the actual values will end up at the end of the performance period if new or unexpected criteria should arise. For example, consider FIG. 1, which shows a graph 100 with a line 102 that shows actual historical data for a business parameter (e.g., sales, inventory, contact calls, etc.). Graph 100 includes a "green" zone 104, a "yellow" zone 106, and a "red" zone 108. Data points in zone 104 are at or above expectations, data points within zone 106 are slightly below expectations, and data points within zone 108 are significantly below expectations.

Using only graph 100, it appears that the enterprise will fall below it's business target in the last quarter of the year, since it is a logical assumption that line 102 will continue to move downwards. However, a new contract, an expected seasonal upturn, or any other new, previously overlooked, or unexpected condition may result in line 102 turning upwards. These criteria are not represented in graph 100, and thus there is no way to adjust the graph without manually manipulating the underlying database.

SUMMARY OF THE INVENTION

To address the problem described above regarding managing graphical data, an improved method, apparatus and computer-readable medium is presented. In one embodiment, the method includes dynamically adjusting data in a database by graphically manipulating a graph that represents the database. In one embodiment, a predictive cone is overlaid onto the graph. The predictive cone is created from a heuristic algorithm that uses past historical data to predict where future real data will track on the graph.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

The present invention presents a method, system, and computer-readable medium for managing graphical data. One embodiment of the invention allows users to visually set and monitor business targets on a time based continuum. Rather than toggling back and forth between an underlying spreadsheet and a graph that represents data from the spreadsheet, the present invention allows users to visually manipulate a chart of their business targets by dragging and dropping individual points (business targets), thus eliminating the need to reference and enter tabular data, and thus saving business users time and confusion. In one embodiment, the invention affords a user the ability to add and shape graphical lines, which also results in automatic concurrent adjustment to an underlying database.

In another embodiment of the present invention, a graph of business targets, a graph of actual values, and a projected actual value "cone" are incorporated into a single graph to help a user see if an enterprise/department/individual is on track to meeting previously set goals. This combined graph allows users to make decisions more quickly and accurately by visually incorporating business targets, actual values, and other data sources which may include historical trends, market intelligence, and business intelligence into a single easy to read visualization.

Figure 2A:
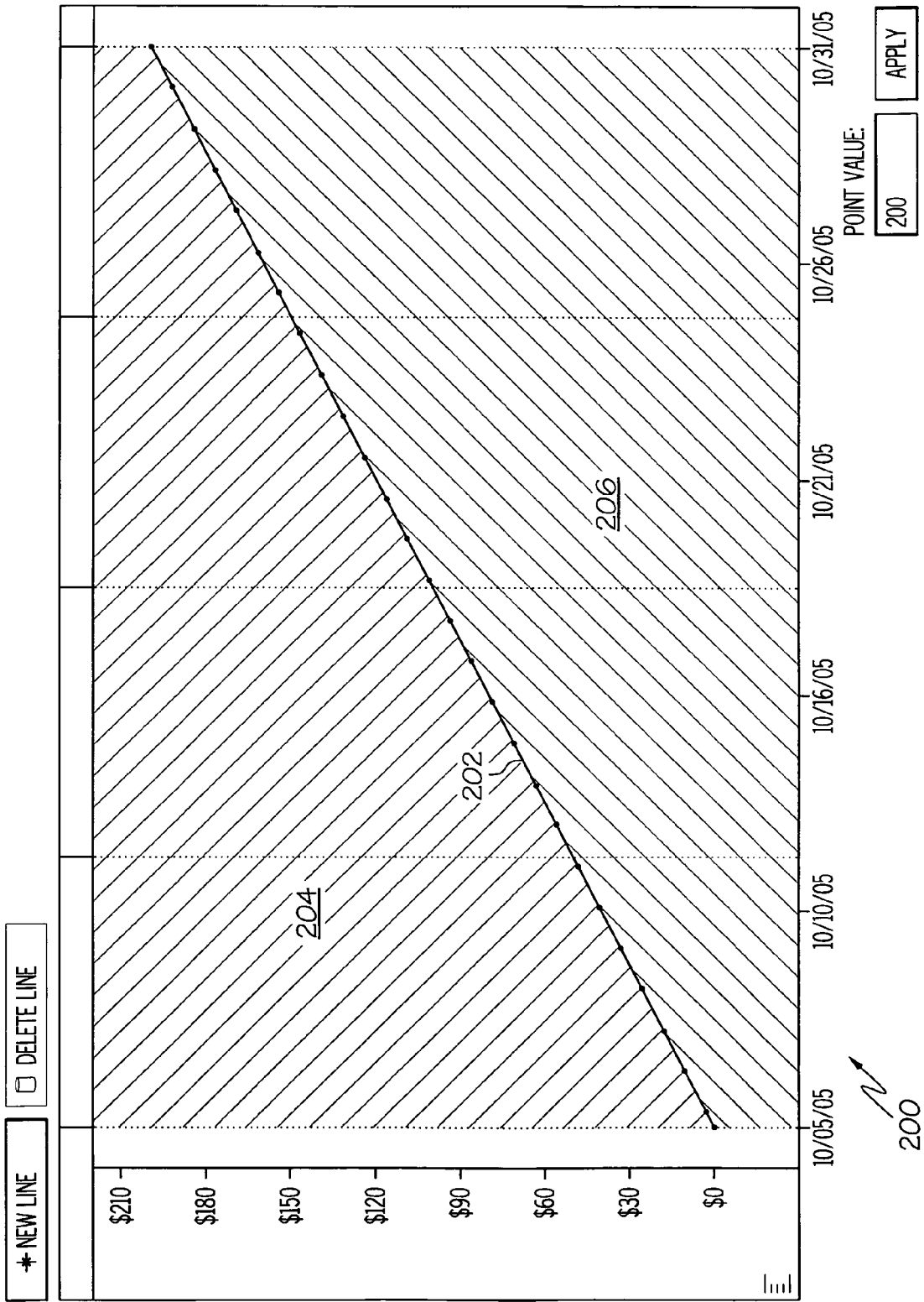
FIGS. 2a-d depict an interactive graph that is capable of dynamically modifying an underlying database by manipulating a display of the interactive graph with an input device.

Referring now to FIG. 2a, a graph 200 contains a line 202, which connects a beginning value (shown for exemplary purposes as "$0") and multiple target values, which are represented by points along line 202. Note that these points may either be finely granular, or they may be more coarsely granular (as shown), such that only the larger dots may be selected along line 202. The "y-axis" represents values of the target (e.g., sales revenue) while the "x-axis" represents dates for each target point along line 202. Points above line 202 are in a "green" zone 204, while points below line 202 are in a "red" zone 206, representing areas above or below the expectations represented by the line 202.

Figure 2B:
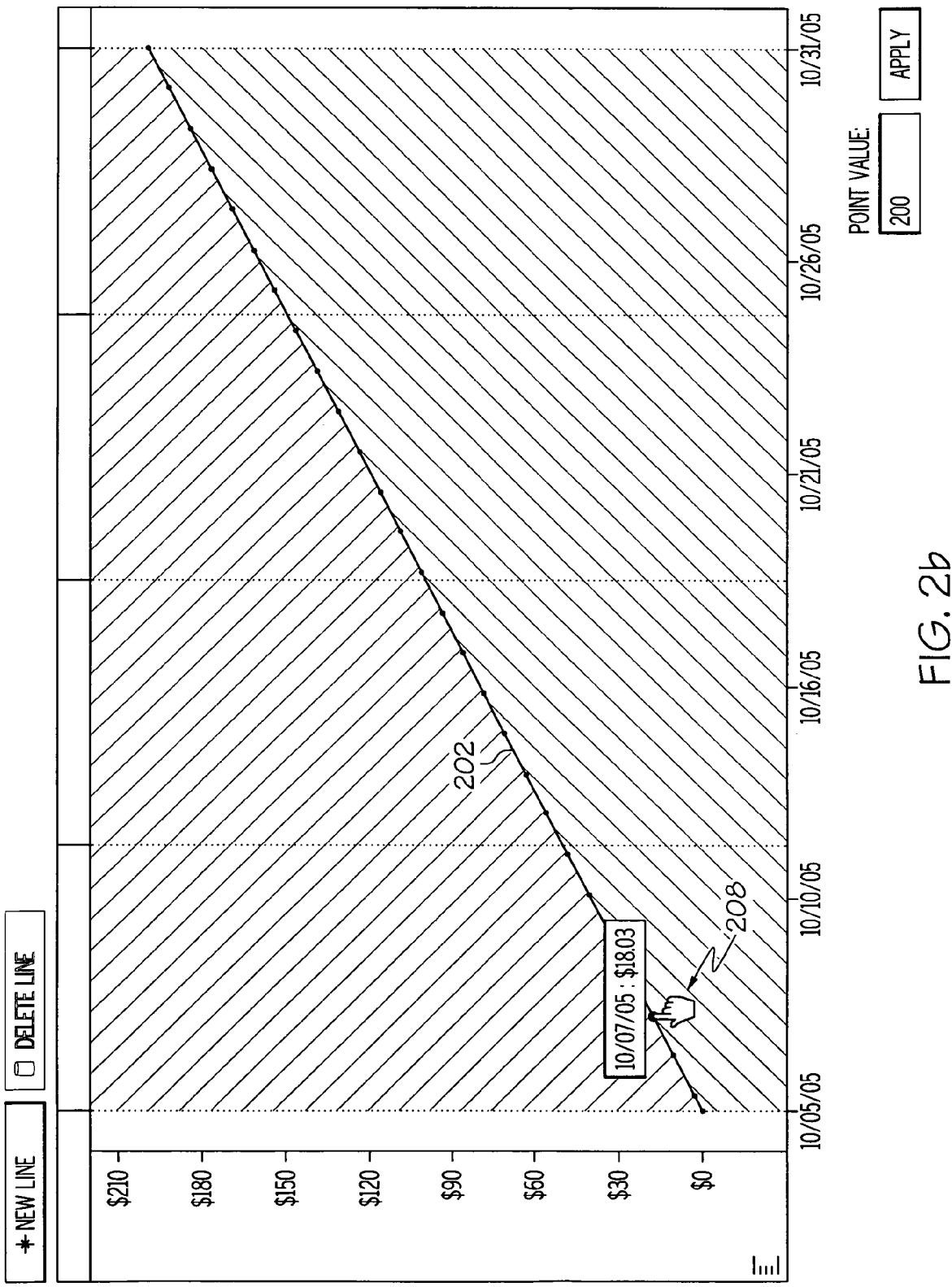
Figure 2C:
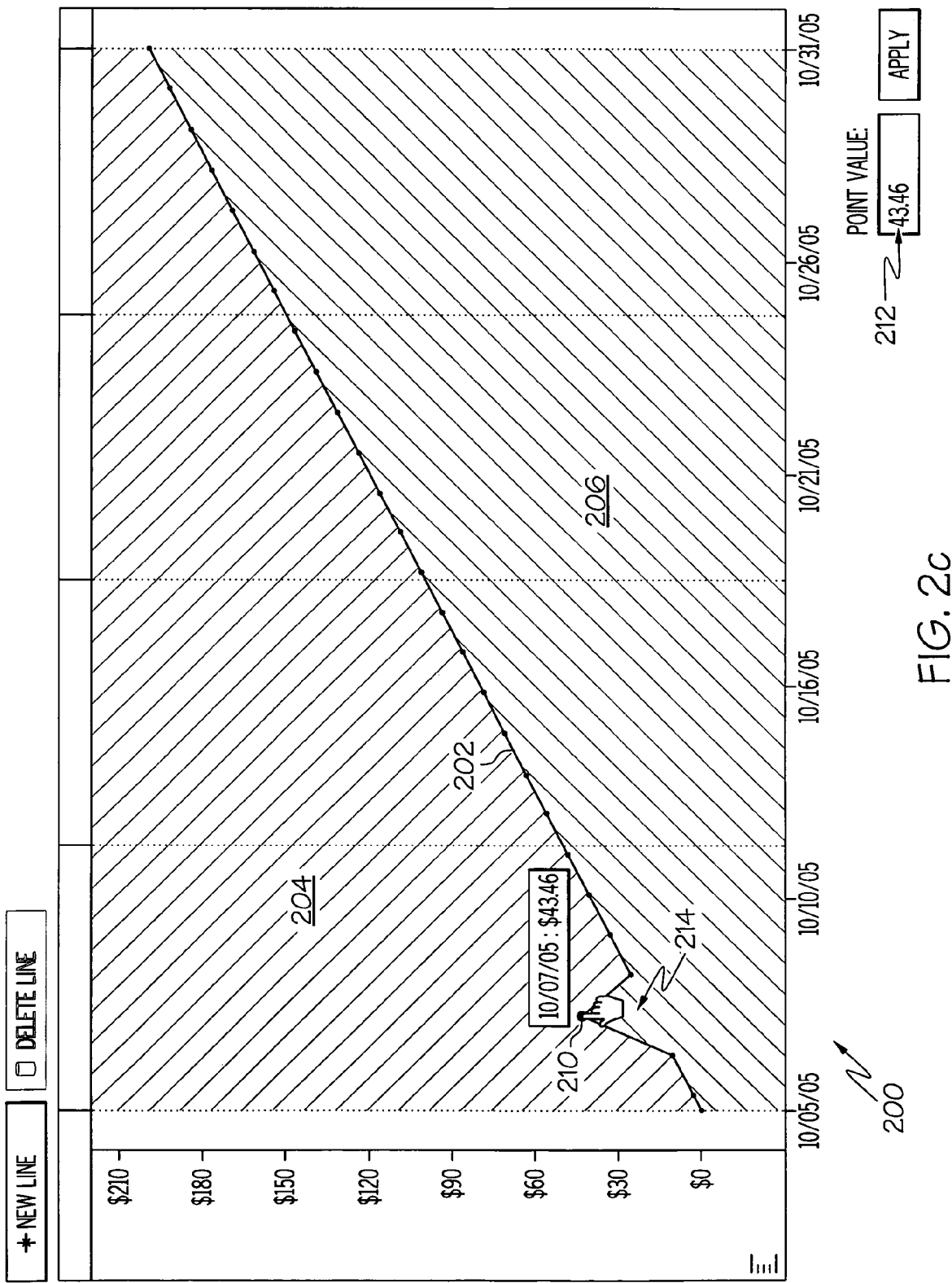
Figure 2D:
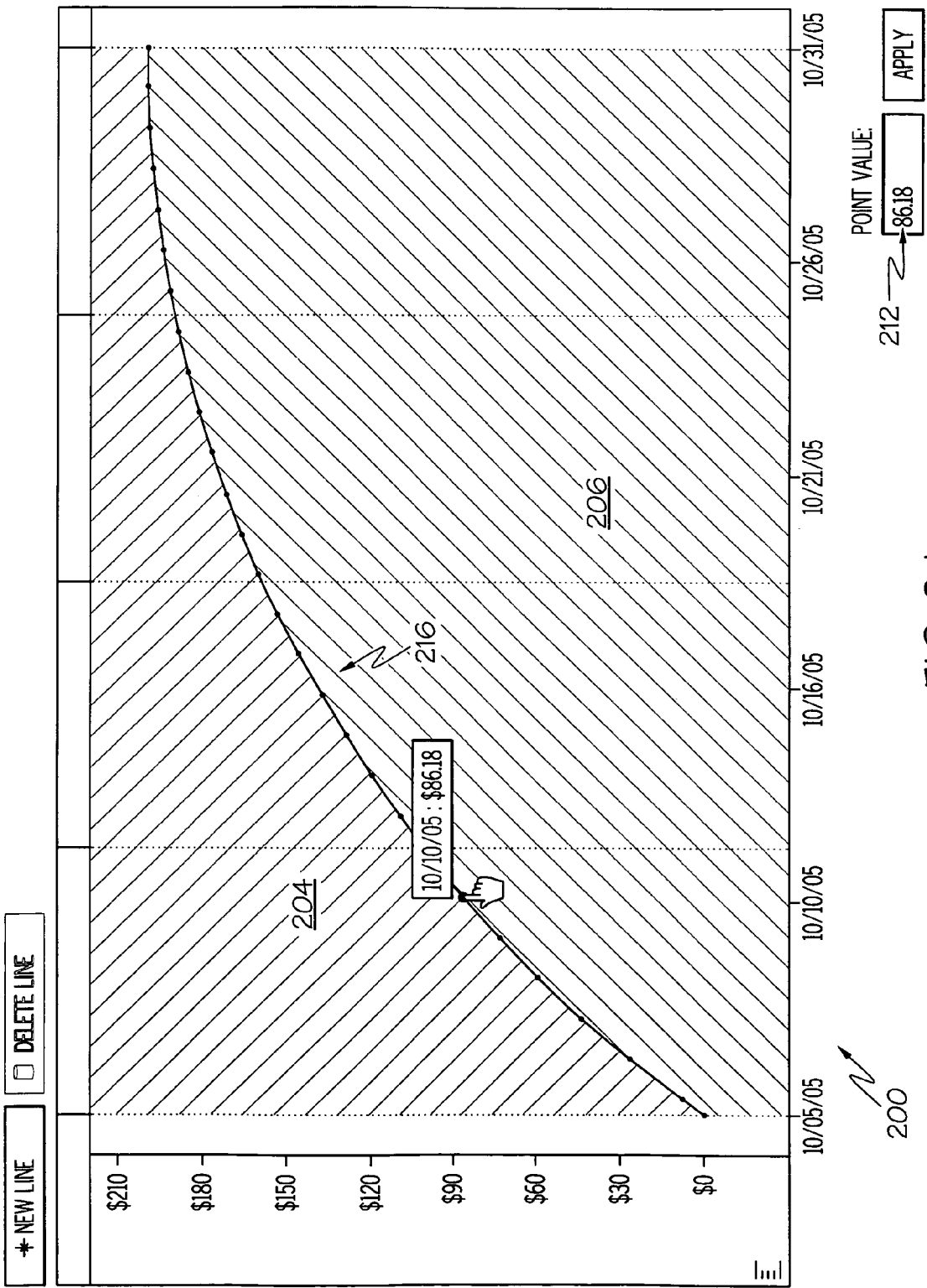

As shown in FIG. 2b, when a user hovers a cursor 208 over a particular point along line 202, two events occur. One, the point itself is magnified, in order to clearly identify which point's data is being viewed. (If resolution on a user interface is inadequate to pinpoint which point is being selected, a magnifier may be invoked to magnify the target area, preferably along pre-defined x-axis parameters such as time periods, etc.) Two, data for that particular point is displayed (e.g., $18.03 for Oct. 7, 2005). If the value for this date is acceptable, the user can move on. However, if the value for this date is not acceptable (the user decides that it is too low or too high for that date), then the user has the opportunity to change it by "dragging" the selected target point to a new position 210, as shown in FIG. 2c. Note that a partial portion of line 202 moves towards new position 210, according to any pre-defined algorithm selected by the user. That is, an algorithm may adjust the slope of line 202 such that it leaves and returns back to its original slope, as shown in FIG. 2c, or else moving the selected target point to new position 210 may result in line 202 being redrawn as an arc 216, as shown in FIG. 2d.

While the selected point is preferably moved to the new position 210 by dragging as just described, alternatively the selected point can be moved to the new position by hovering the cursor 214 over the selected point (causing the selected point to enlarge), clicking the enlarged selected point, and then typing in the new point value (e.g., "$43.46" in FIG. 2c) in a window 212 that is displayed on a same Graphical User Interface (GUI) that is displaying graph 200.

Figure 2E:
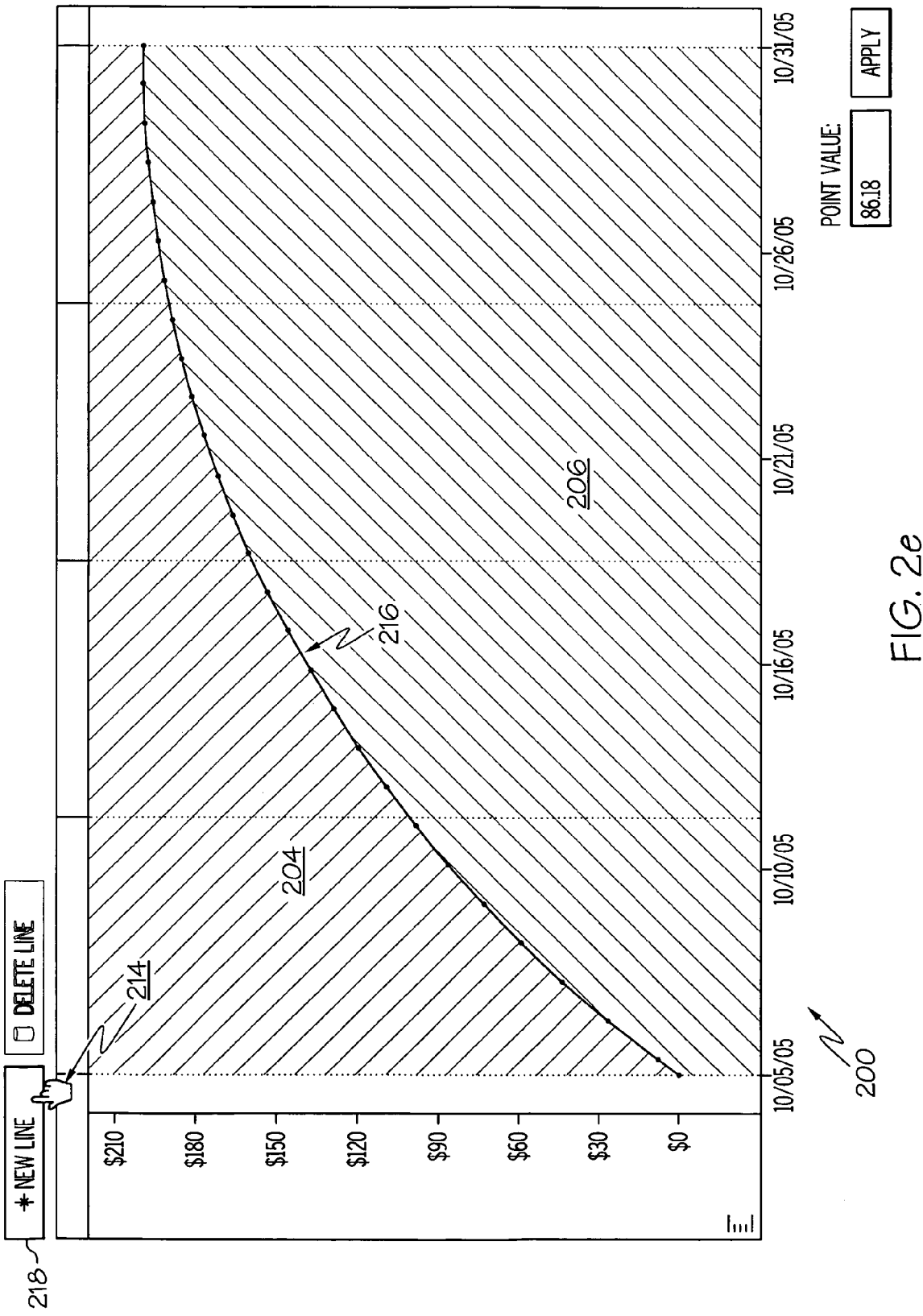
FIG. 2e-h illustrate steps taken to add and remove lines in a graph to create a target zone for a real data track.
Figure 2F:
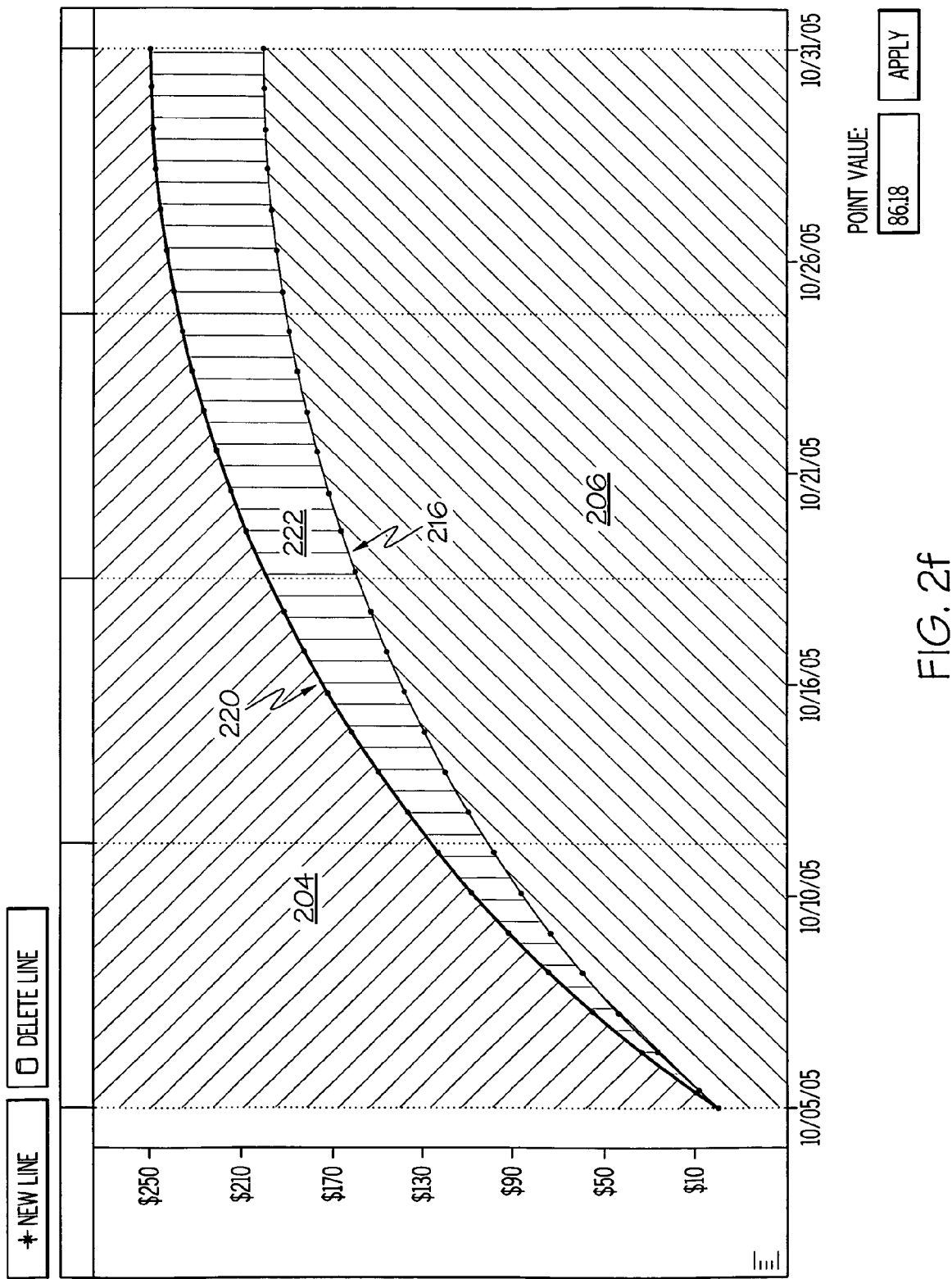
Figure 2G:
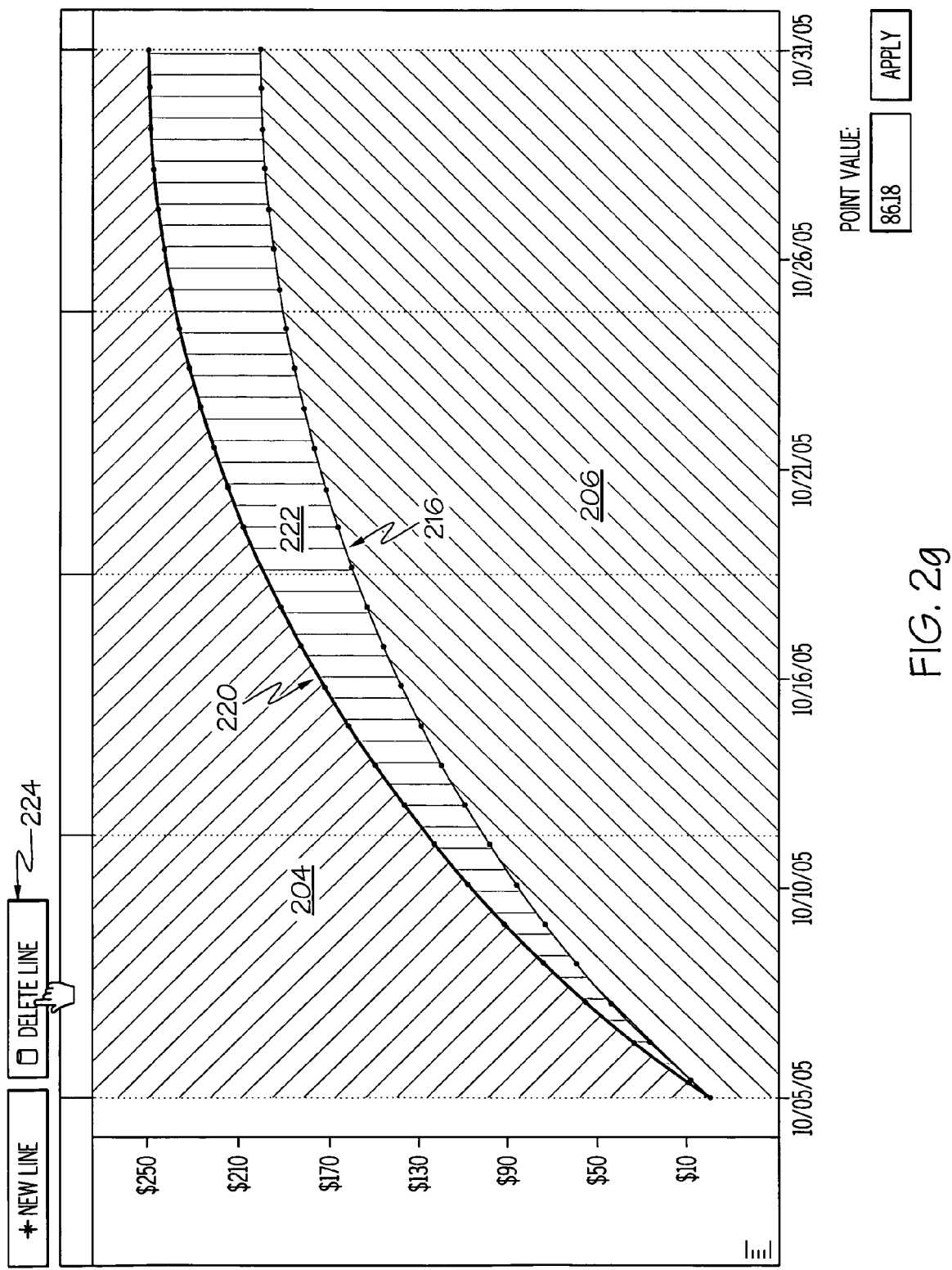
Figure 2H:
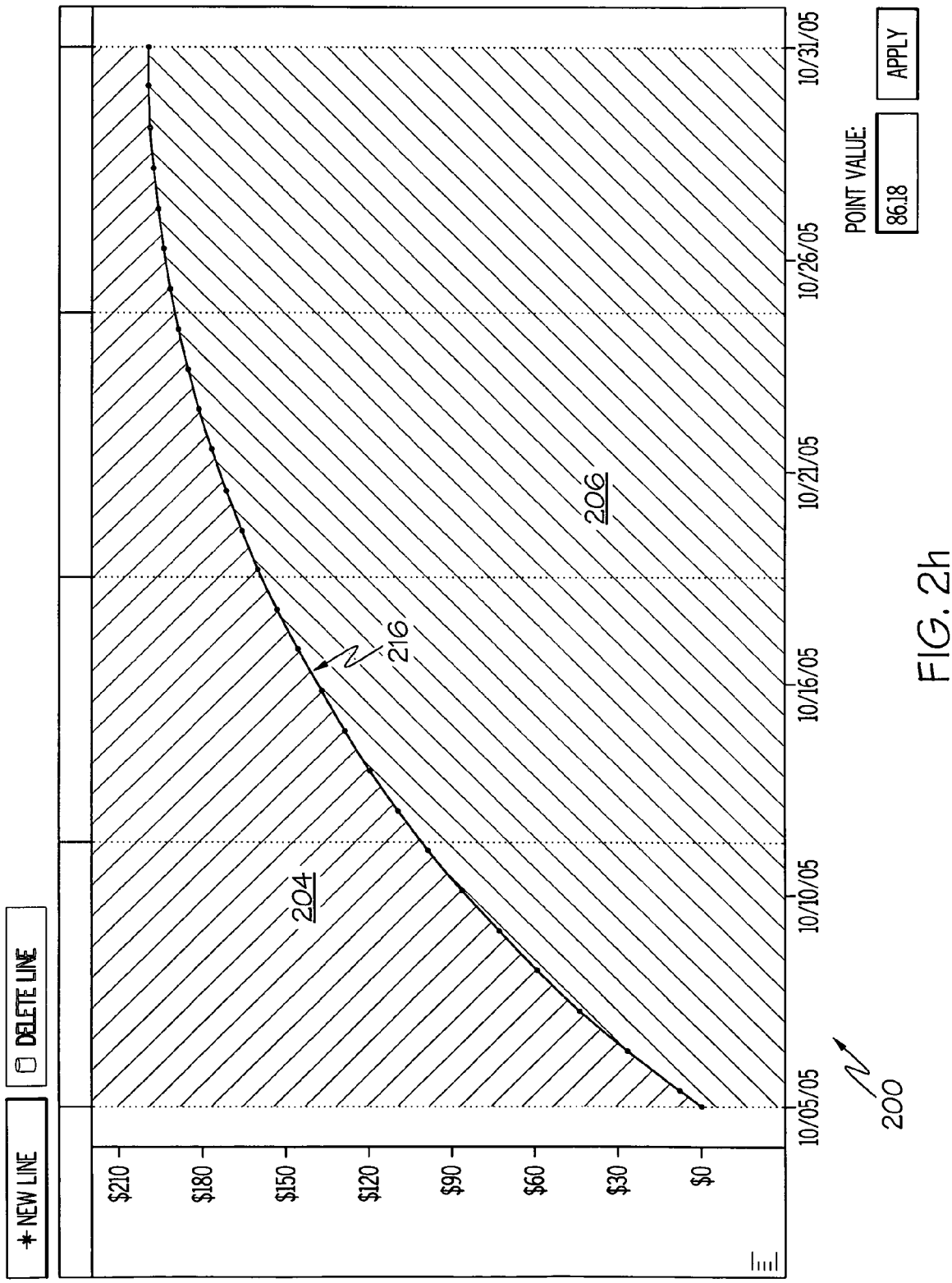

A new line can be added to and/or removed from graph 200, as described in FIGS. 2e-h. As shown in FIG. 2e, button 218 can be clicked by cursor 214. This results in a new line 220, shown in FIG. 2f, which now defines a new zone 222. (Note that the Y-Axis scale changed between FIG. 2e and FIG. 2f). New line 220 is highlighted by being a different color from the old line 216, and new line 220 is also thicker for additional highlighting. Zone 204 is a green target zone, which is bordered by the lower yellow zone 222 (which contains data point ranges that fall slightly below the target), which is bordered by the red zone 206 (which contains data point ranges that fall significantly below the target). Preferably, the new line 220 is created by manually dragging and fixing the endpoints (e.g., at Oct. 5, 2005 and Oct. 31, 2005 in the exemplary depiction of FIG. 2f) of new line 220. This creates a new entry into an underlying database that contains corresponding data. To remove the new line 220, the delete line button 224 is clicked (FIG. 2g), thus removing new line 220 (as shown in FIG. 2h).

Note that while the graph 200 in FIG. 2e has been depicted as having an initial single line 216, the present invention is equally useful in adding lines when a graph 200 has multiple initial lines. As such, when a new line 220 is added to a graph that has more than one old lines 216, then the new line 220 appears above a currently selected old line 216 (which can be selected by cursor movement, highlighting, etc.). If no old line is selected, then the new line 220 appears above the last edited line (either an old line 216 or a recently added new line 220). If no line is selected and no lines have been edited, then the new line 220 appears above all of the existing lines (216 and/or 220).

Figure 2I:
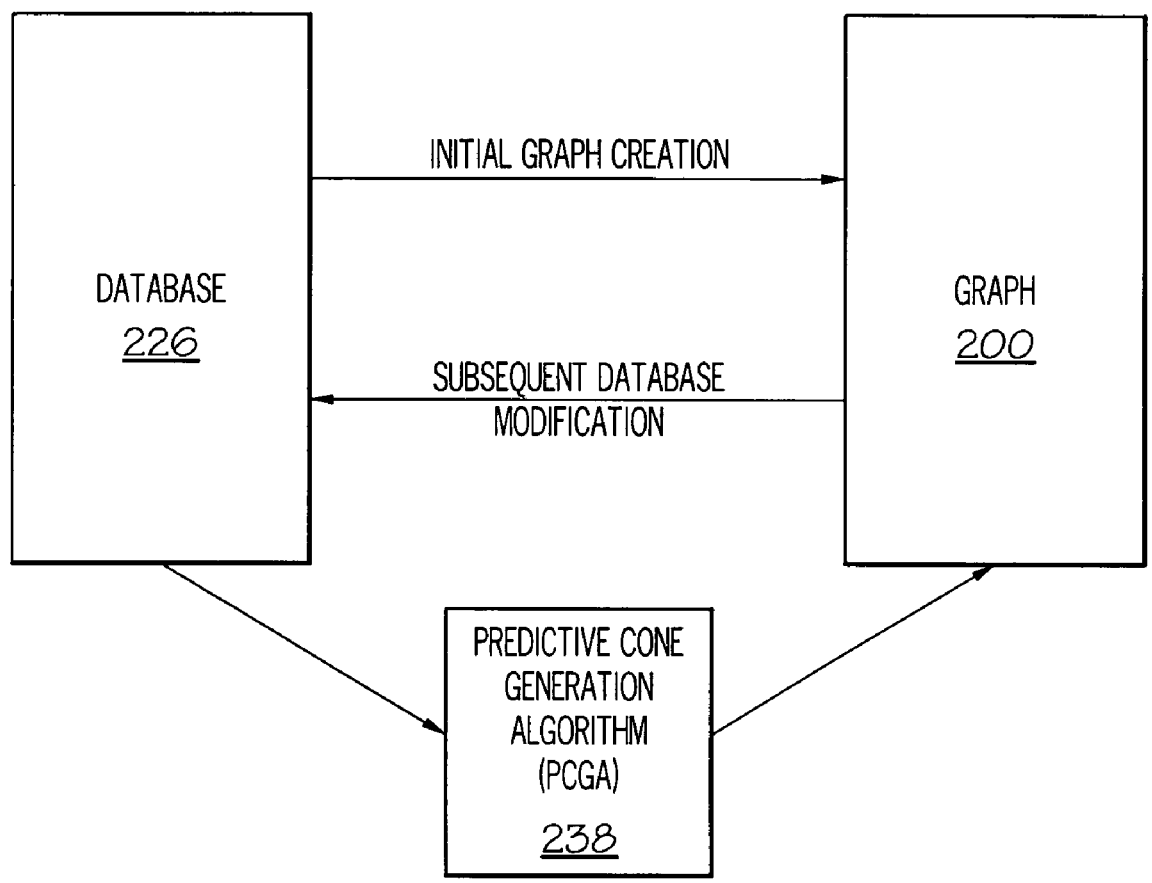
FIG. 2i depicts a relationship among a database, a graph, and an algorithm used to generate a predictive cone, which is depicted in FIG. 2k (which is derived from the graph shown in FIG. 2j)

FIG. 2i thus provides an overview of the relationship between graph 200 and a database 226. As shown, database 226 initially creates/populates graph 200 in a GUI. Thereafter, rather than modifying database 226 by entering new or revised data into database 226 (e.g., entering data into cells in a spreadsheet), database 226 is modified by the manual act of manipulating lines and/or other shapes directly on graph 200, which causes values in database 226 to be updated accordingly.

Figure 1:
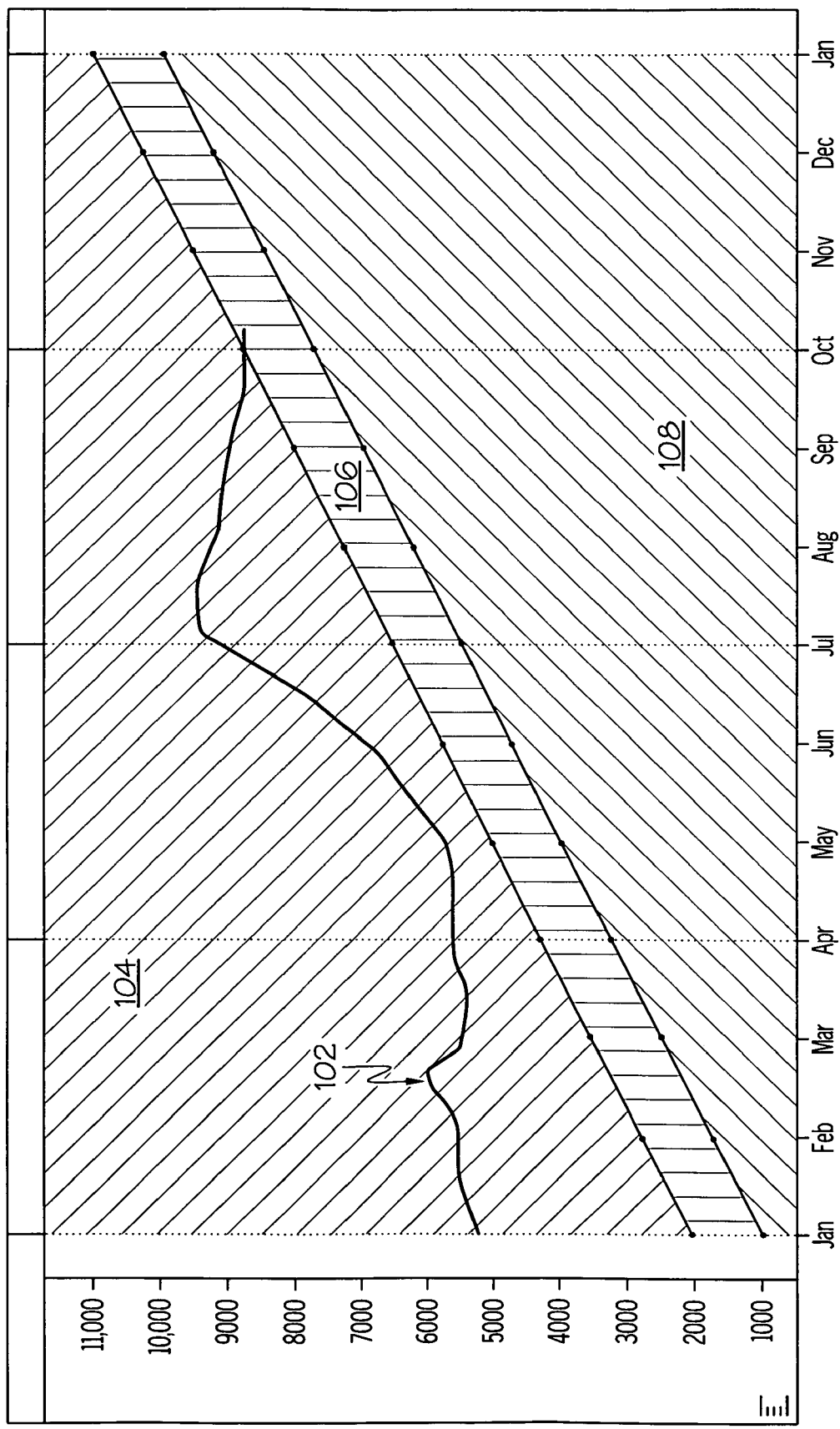
FIG. 1 is a prior art graph showing a graph that has been populated with points taken from a database.
Figure 2J:
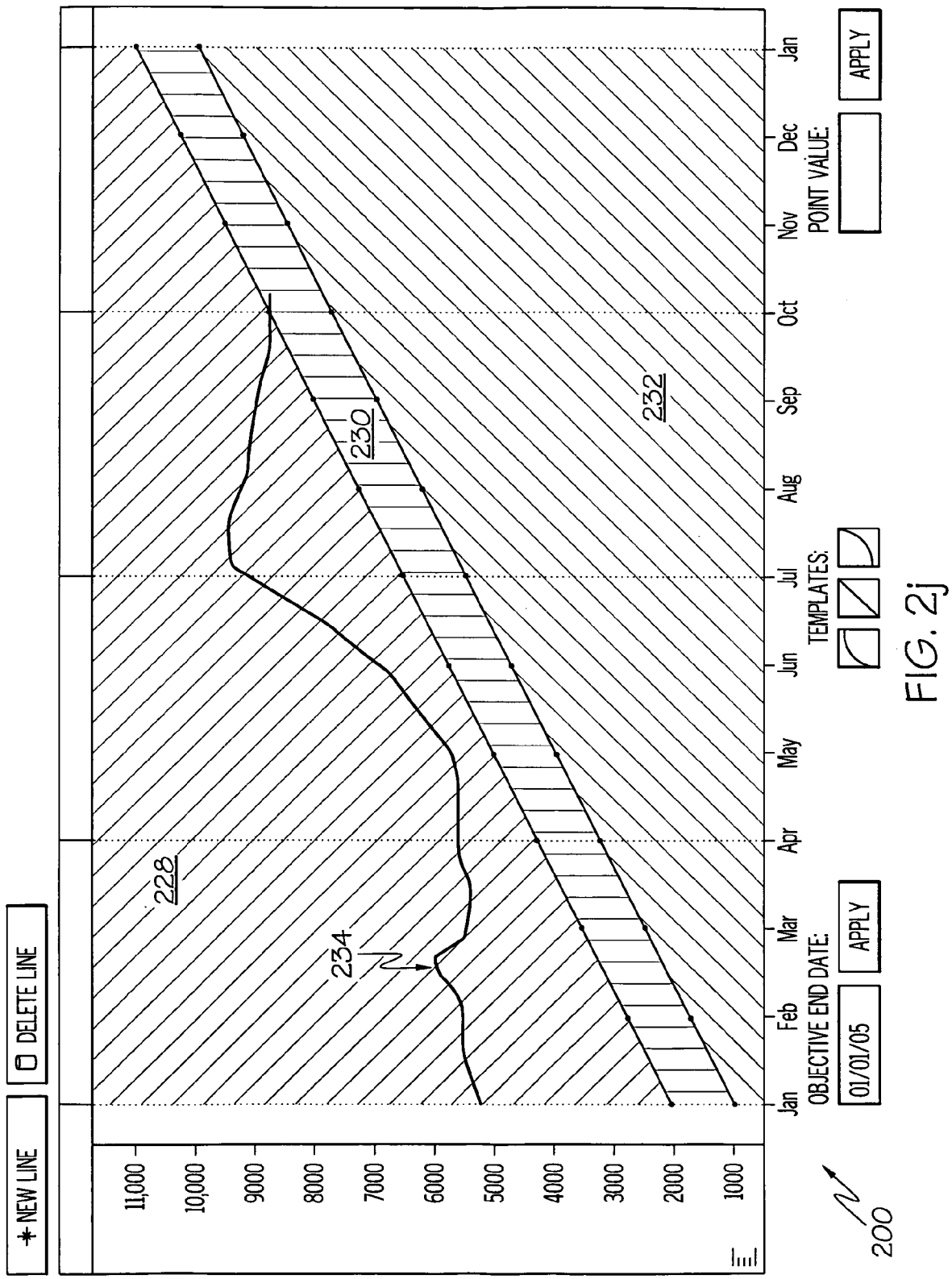
FIG. 2l-n illustrate steps taken to change a range and shape of a line in a graph.

Another embodiment of the present invention includes the ability to predict a future pathway of line 234. With reference now to FIG. 2j, graph 200 is depicted. Graph 200 is similar to graph 100 depicted in FIG. 1, except that graph 200 has additional novel features. Specifically, graph 200 has the ability to generate a predictive cone 236. Unlike graph 100, in which the user is unable to see how historical trends, market intelligence, business intelligence, and other data sources contribute to what is occurring in graph 100, graph 200 is able to utilize these and other factors to create predictive cone 236. By clicking an icon (not shown) or a special function key, an algorithm is invoked which creates predictive cone 236. Predictive cone 236 is constructed by combining known historical data, new data, and current real-time performance data using the algorithm. Historical data may include elements such as, but not limited to, performance in a same period from previous times. New data may include, but is not limited to, new contracts, new customers, new store openings, new legal laws and regulations, etc. Current real-time performance data is typically that depicted by line 234. Thus, for example, the algorithm may include an input that states that the last quarter of each year has experienced a 25% increase in product orders every year for the past ten years (historical data), that a new contract was just signed for a major customer who needs 1,000 units of product per day (new data), and orders for the past three months has been nearly flat (between 9,000 and 8,500 units sold per day). By combining these inputs from database 226 (shown in FIG. 2i), a Predictive Cone Generation Algorithm (PCGA) 238 (also shown in FIG. 2i) generates predictive cone 236 and overlays it on graph 200. Predictive cone 236 graphically depicts the prediction that line 234 will likely remain and/or end up (at year's end) in green zone 228 (exceeding expectations), yellow zone 230 (falling just short of expectations), and NOT in red zone 232 (falling well below expectations.) Thus, a manager can see that it is likely that the stated goals will be met by year-end, and thus no changes to work practices are necessary.

Figure 2K:
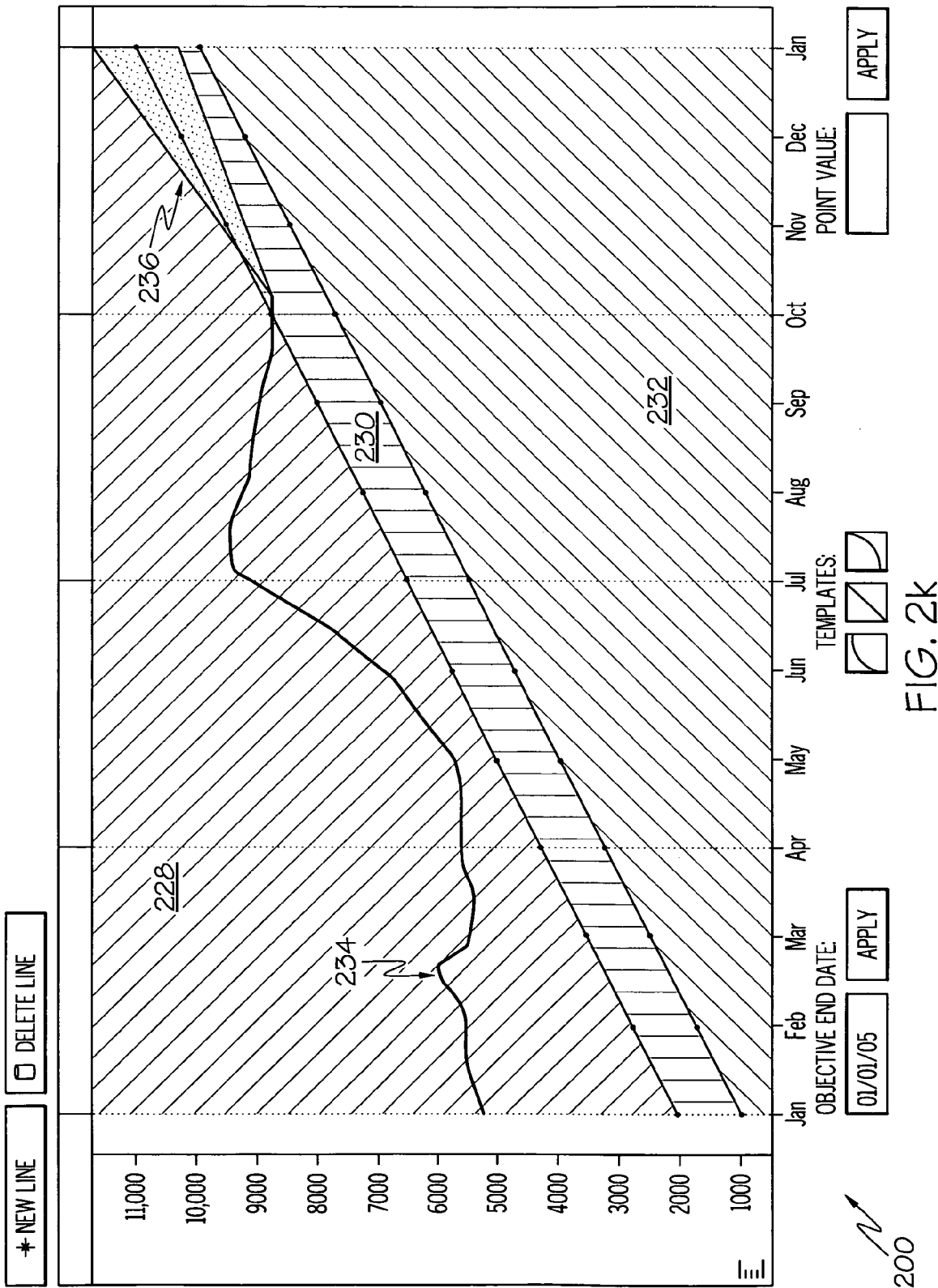
Figure 21:
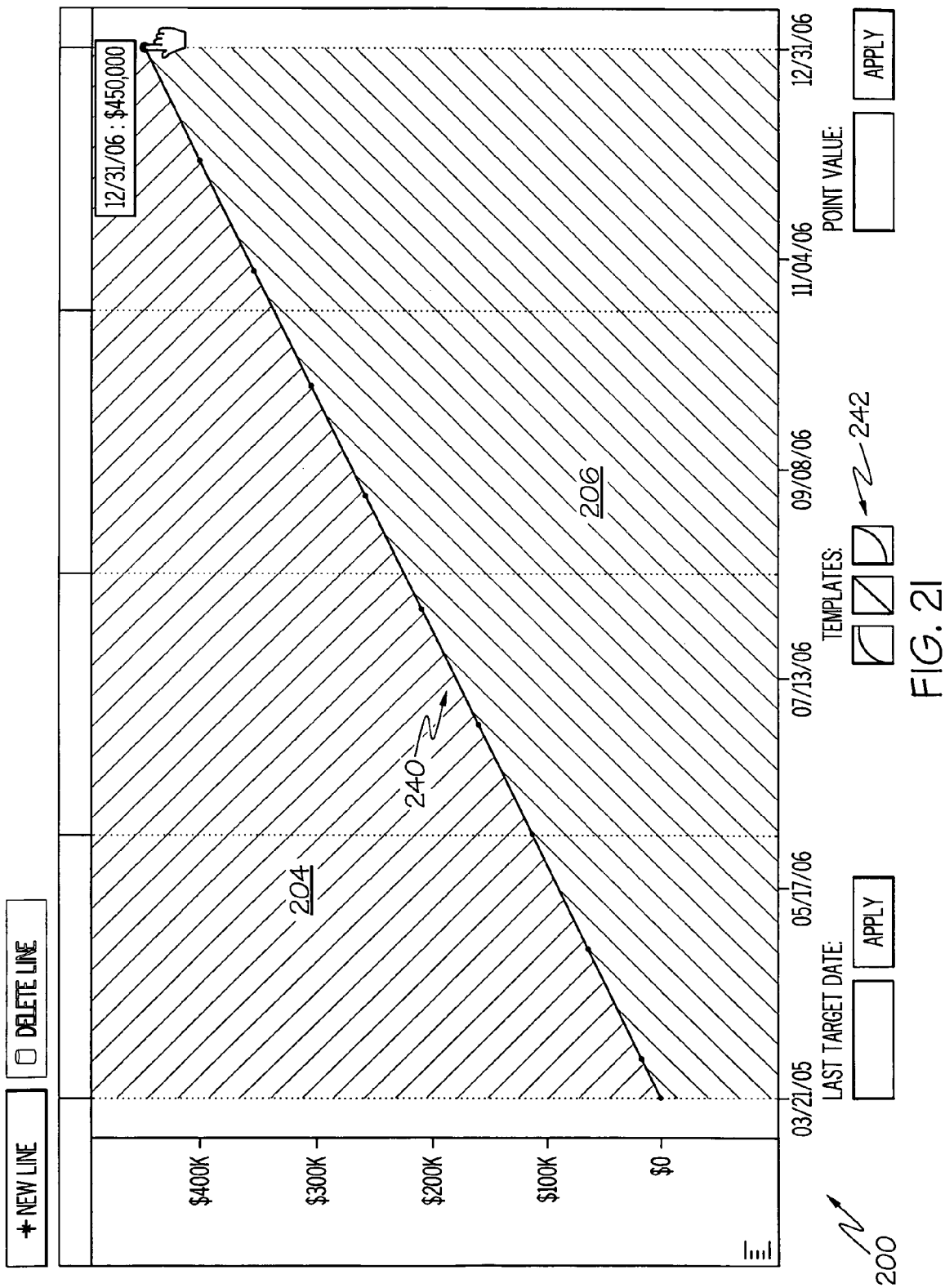
Figure 2M:
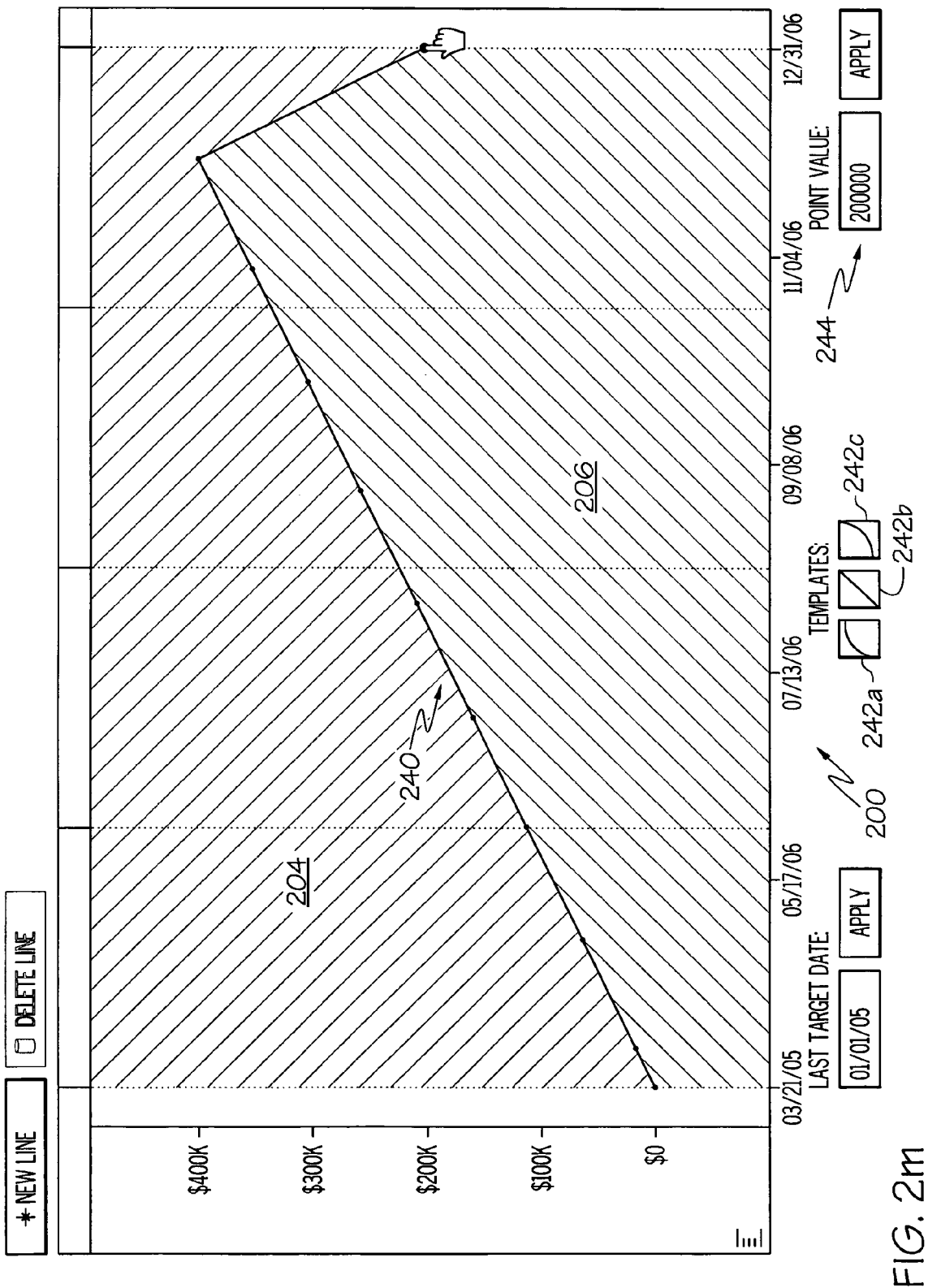
Figure 2N:
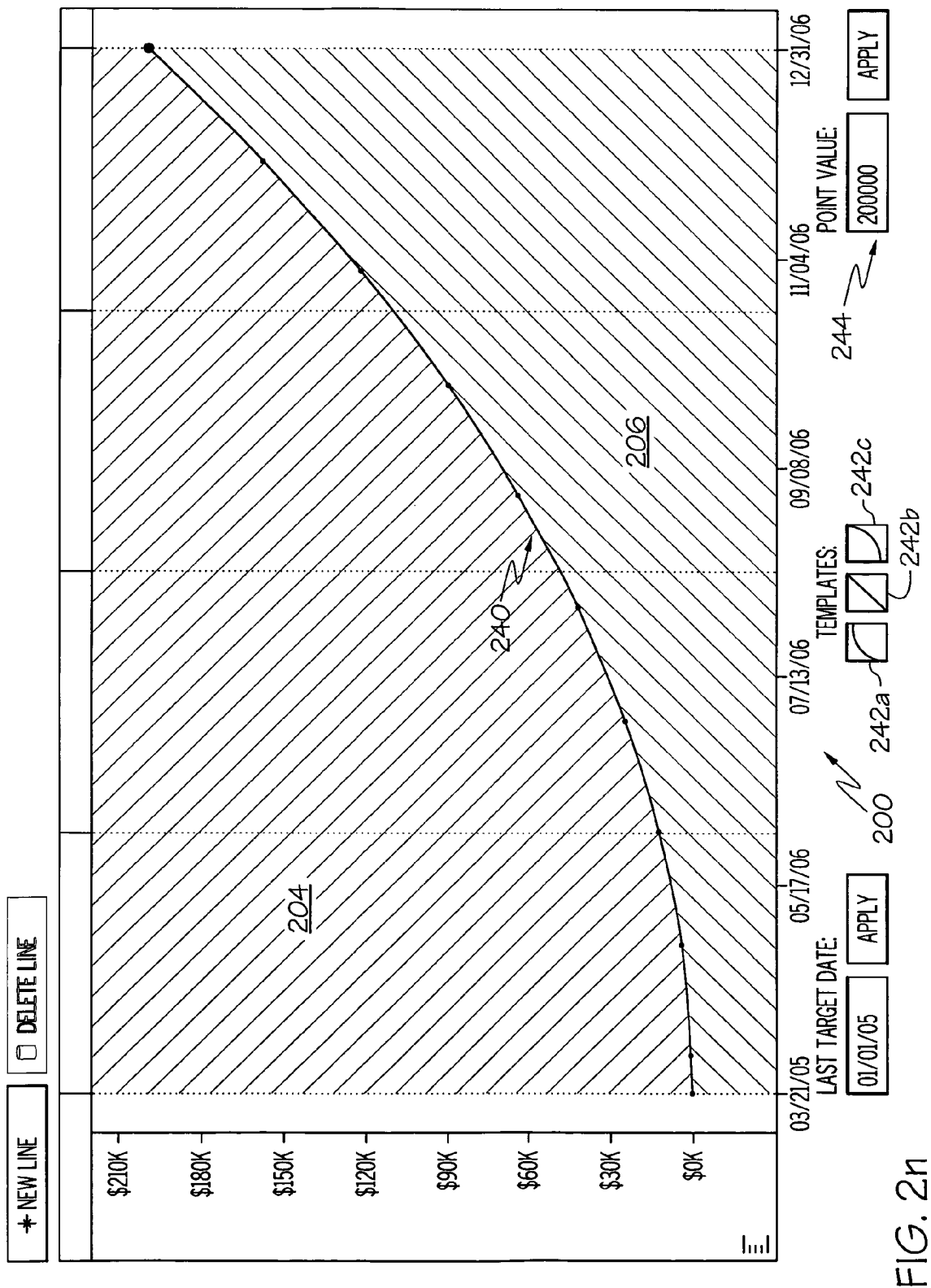

Another embodiment of the present invention is depicted in FIGS. 2l-n. As depicted in FIG. 2l, graph 200 has an original line 240 demarking, which is shown for exemplary purposes as starting at $0 and ending at $450,000. However, the user desires to change two aspects of line 240. First, as executed in FIG. 2m, the user drags an endpoint of line 240 to $200,000 on the Y-axis (as confirmed by or executed by input to window 244). Now that the beginning and final targets are in the desired places, the intermediate points between the beginning and final targets are created to complete a new shape for line 240. The user is therefore provided one or more buttons 242, which show different shape lines that are available to the user. If the user desires a line that shows a rapid initial increase followed by a tapering off (of sales, production costs, etc.), then button 242a is selected. If a more linear cumulative total is desired, then button 242b is selected. In the example shown in FIG. 2n, however, the user desires a line that shows modest initial gain, followed by a flurry of activity at year's end, and thus button 242c is chosen. By clicking button 242c, the upwardly arcing line 240 shown in FIG. 2n is automatically generated, with the selected shape and starting/ending endpoints. Note that the scale of the Y-axis is automatically changed to provide proper proportioning to the newly defined line 240, while leaving the endpoint ($200,000) unchanged. The steps illustrated in FIGS. 2l-n allow the user to modify all points in line 240 in a very quick fashion. Note that, as in a manner described for other embodiments above, this method allows the user to modify back end data (underlying support data) without having to actually access that data in its basic tabular format, and thus the user can avoid the tedious steps of changing data in a spreadsheet or other similar program.

Figure 3A:
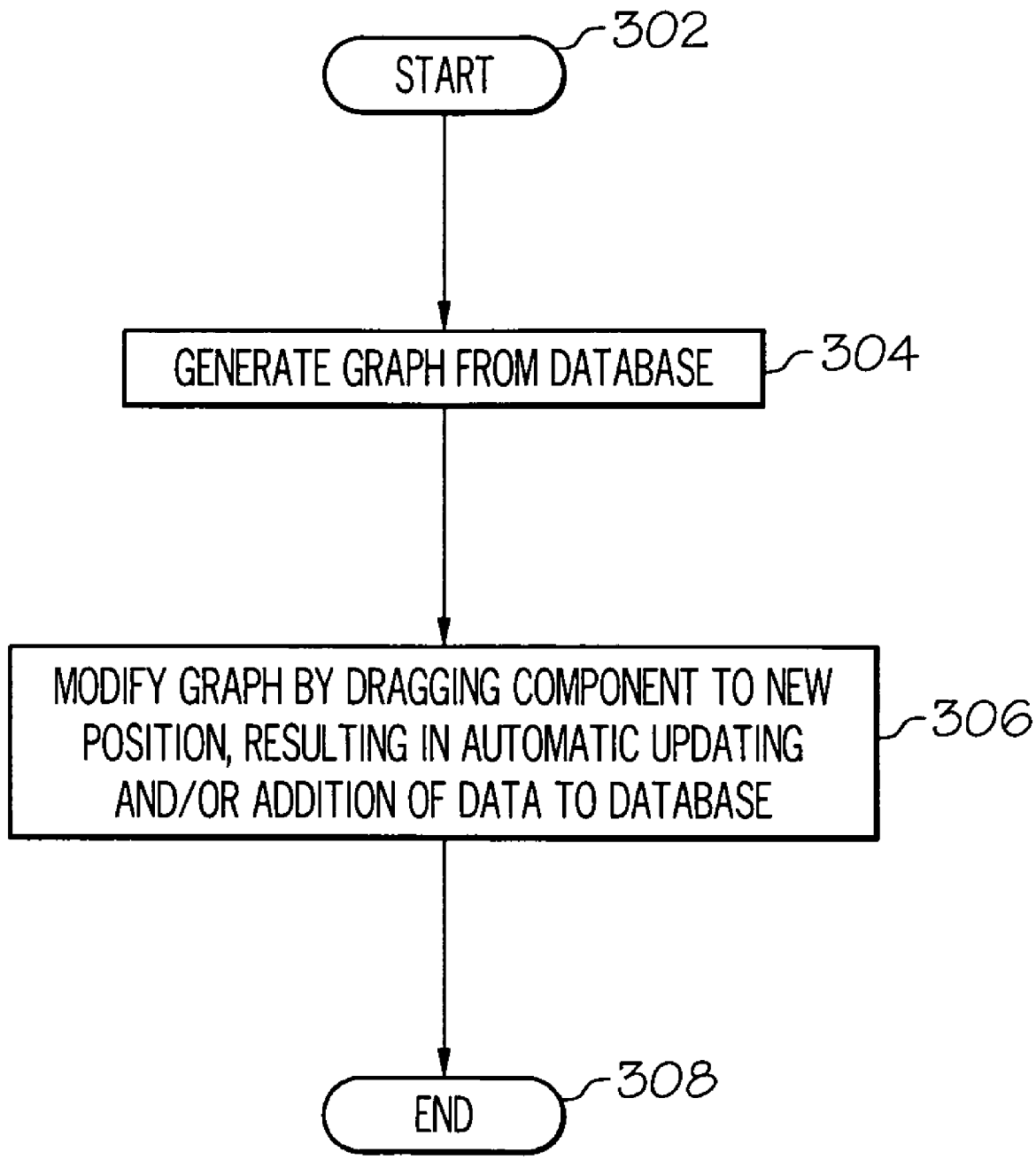
FIGS. 3a-c are flow-charts showing exemplary steps taken to utilize the interactive graph to modifying underlying databases, create target zones, and generate predictive cones.

Referring now to FIG. 3a, a flow-chart describing operations depicted in FIGS. 2c-d is presented. After initiator block 302, a graph is generated by a database (block 304). As described in block 306, this graph, which includes a line 202 in FIGS. 2c-d, is modified by dragging a point (component) of the line to a new position. This results in the automatic adjustment to data in the database to correspond with the new graphical position of the dragged point, thus ending the process (terminator block 308).

Figure 3B:
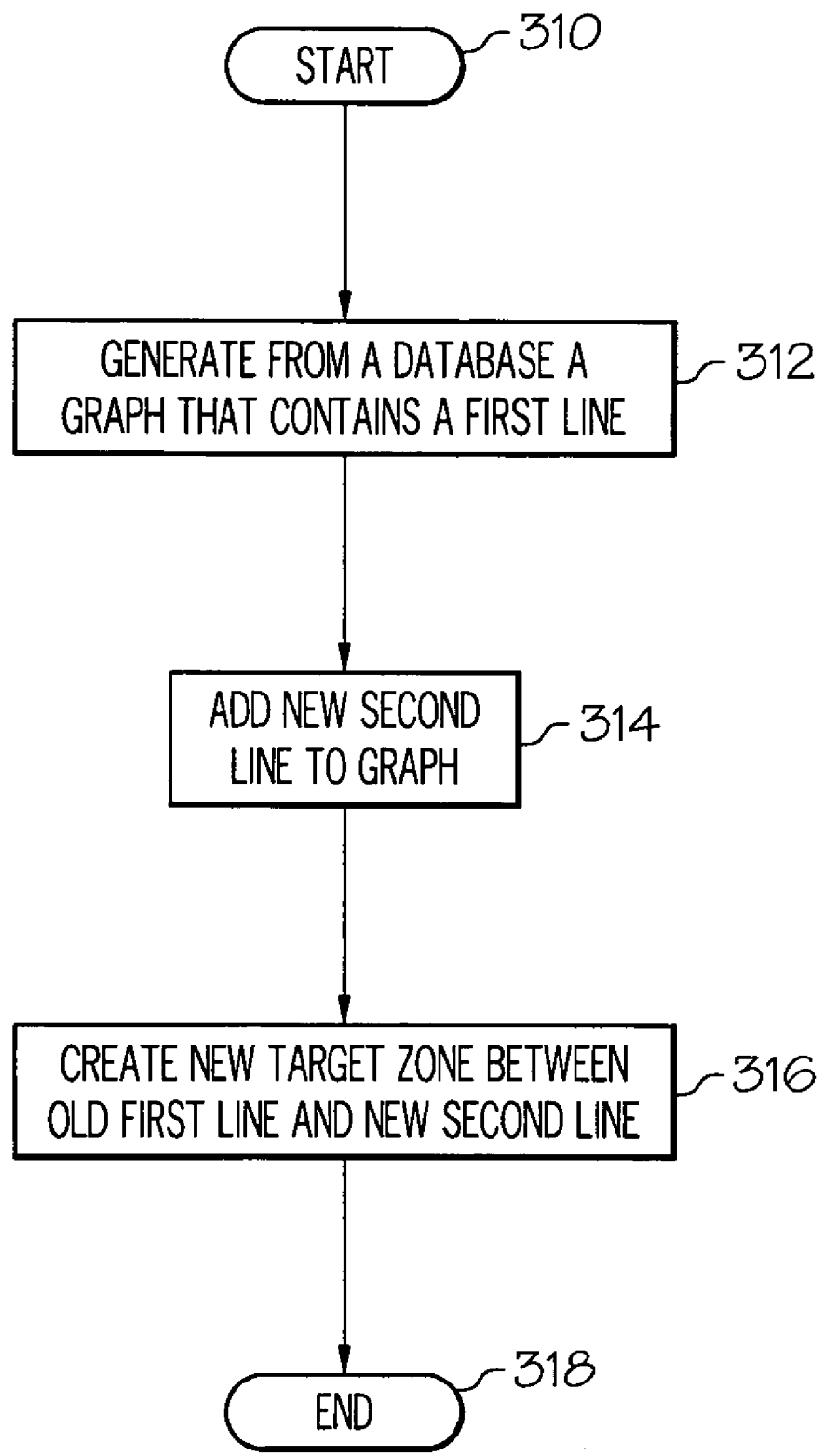

Referring now to FIG. 3b, a flow-chart describing operations depicted in FIGS. 2e-f is presented. After initiator block 310, a graph containing a first line is generated by a database (block 312). Next, a second line is overlaid onto the graph using an input device such as a cursor, a tablet pen, keyboard cursor keys, etc. (block 314). This automatically creates a zone between the first and second lines (block 316). This zone is the area between the green zone and red zone, as described above. The process ends at terminator block 318.

Figure 3C:
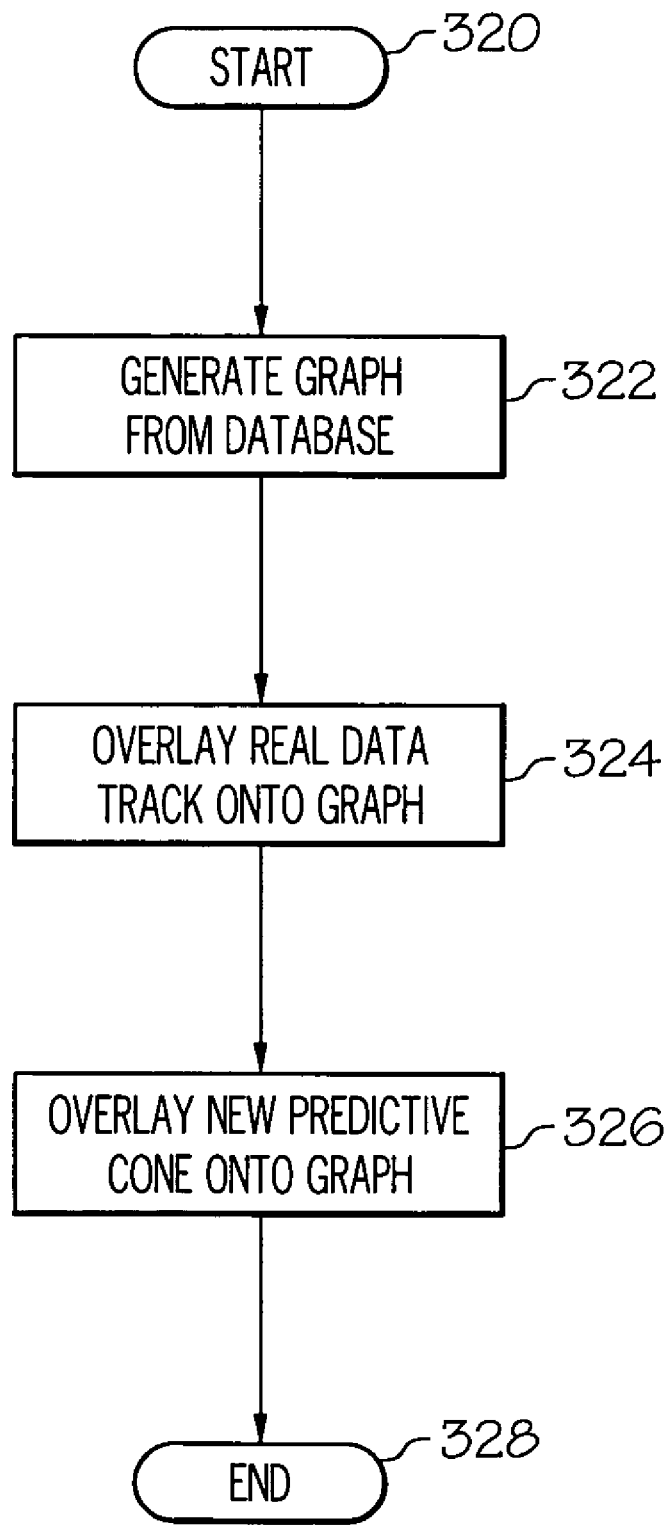

There are times when additional information is needed to determine if a real data track will stay at or above the target zone, such as described above with reference to the predictive cone shown in FIG. 2k. FIG. 3c presents exemplary steps for utilizing such a predictive cone. After initiator block 320, the graph is initially generated from data from the underlying database (block 322). The real data track, which represents actual historical data from a current period, is overlaid onto the graph (block 324). As described in block 326, if it appears that the real data track will not remain at or near the target zone in the future, then a predictive cone is generated using data in the database, and the predictive cone is then overlaid onto the graph. Note that the predictive cone can be generated whenever new or overlooked data is recognized. That is, while the predictive cone is useful when the real data track appears to be headed away from the target zone (either below or above the target zone), the predictive cone can also be useful if the real data track appears to be on course to stay within the target zone, while the new or overlooked data may in fact predict that the real data track will veer out of the target zone. The process ends at terminator block 328.

Figure 4:
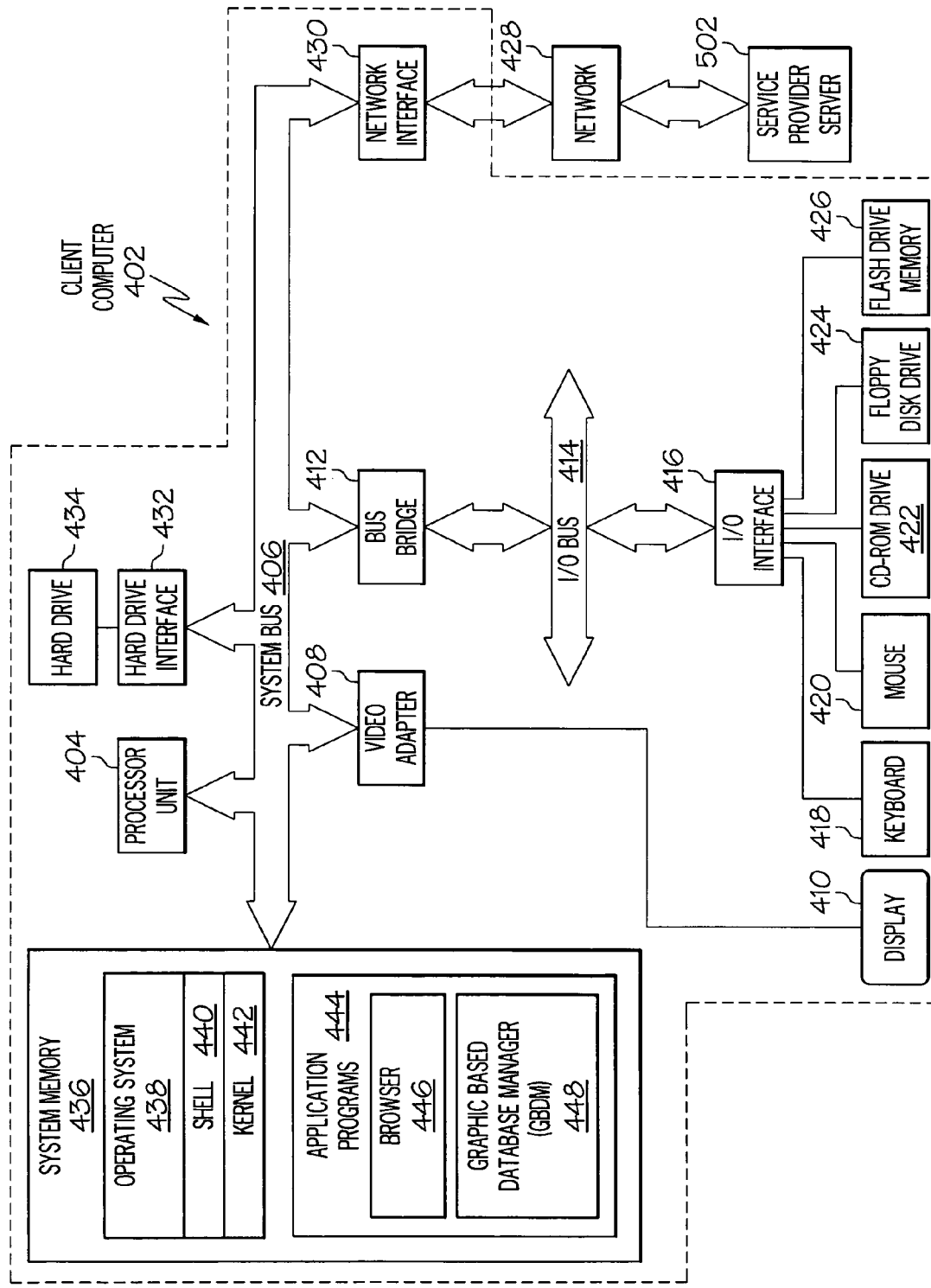
FIG. 4 depicts an exemplary client computer in which the present invention may implemented.

With reference now to FIG. 4, there is depicted a block diagram of an exemplary client computer 402, in which the present invention may be utilized. Client computer 402 includes a processor unit 404 that is coupled to a system bus 406. A video adapter 408, which drives/supports a display 410, is also coupled to system bus 406. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk-Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Client computer 402 is able to communicate with a service provider server 502 via a network 428 using a network interface 430, which is coupled to system bus 406. Network 428 may be an external network such as the Internet, or an internal network such as an Ethernet or a Virtual Private Network (VPN). Using network 428, client computer 402 is able to use the present invention to access service provider server 502.

A hard drive interface 432 is also coupled to system bus 406. Hard drive interface 432 interfaces with a hard drive 434. In a preferred embodiment, hard drive 434 populates a system memory 436, which is also coupled to system bus 406. Data that populates system memory 436 includes client computer 402's operating system (OS) 438 and application programs 444.

OS 438 includes a shell 440, for providing transparent user access to resources such as application programs 444. Generally, shell 440 is a program that provides an interpreter and an interface between the user and the operating system. More specifically, shell 440 executes commands that are entered into a command line user interface or from a file. Thus, shell 440 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 442) for processing. Note that while shell 440 is a text-based, line-oriented user interface, the present invention will equally well support other user interface modes, such as graphical, voice, gestural, etc.

As depicted, OS 438 also includes kernel 442, which includes lower levels of functionality for OS 438, including providing essential services required by other parts of OS 438 and application programs 444, including memory management, process and task management, disk management, and mouse and keyboard management.

Application programs 444 include a browser 446. Browser 446 includes program modules and instructions enabling a World Wide Web (WWW) client (i.e., client computer 402) to send and receive network messages to the Internet using HyperText Transfer Protocol (HTTP) messaging, thus enabling communication with service provider server 502.

Application programs 444 in client computer 402's system memory also include a Graphic Based Database Manager (GBDM) 448, which includes PCGA 238 described above. GBDM 448 includes code for implementing the processes described in FIGS. 2a-3c. In one embodiment, client computer 402 is able to download GBDM 448 from service provider server 502.

The hardware elements depicted in client computer 402 are not intended to be exhaustive, but rather are representative to highlight essential components required by the present invention. For instance, client computer 402 may include alternate memory storage devices such as magnetic cassettes, Digital Versatile Disks (DVDs), Bernoulli cartridges, and the like. These and other variations are intended to be within the spirit and scope of the present invention.

Figure 5:
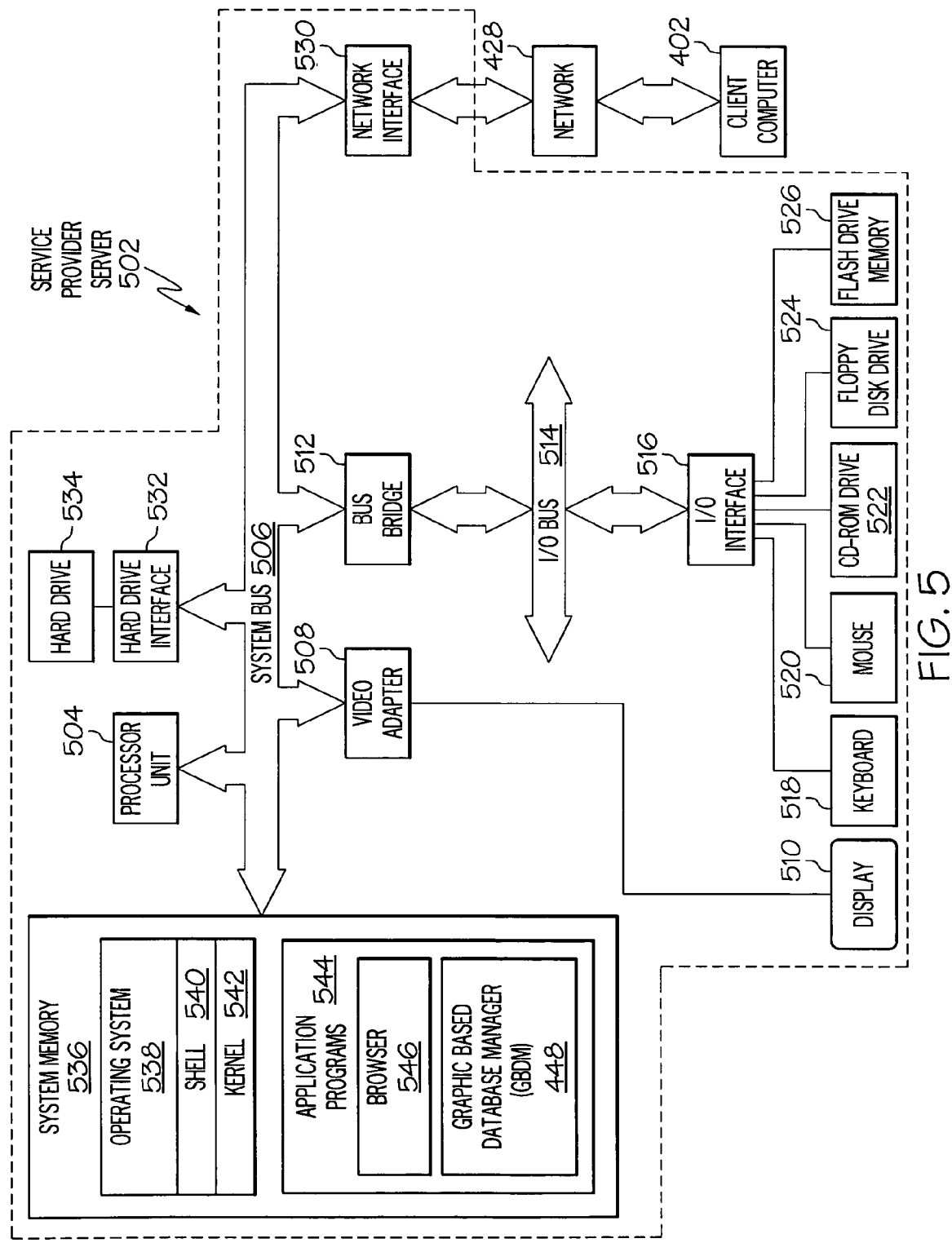
FIG. 5 illustrates an exemplary server from which software for executing the present invention may be deployed and/or implemented for the benefit of a user of the client computer shown in FIG. 4.

As noted above, GBDM 448 can be downloaded to client computer 502 from service provider server 502, shown in exemplary form in FIG. 5. Service provider server 502 includes a processor unit 504 that is coupled to a system bus 506. A video adapter 508 is also coupled to system bus 506. Video adapter 508 drives/supports a display 510. System bus 506 is coupled via a bus bridge 512 to an Input/Output (I/O) bus 514. An I/O interface 516 is coupled to I/O bus 514. I/O interface 516 affords communication with various I/O devices, including a keyboard 518, a mouse 520, a Compact Disk-Read Only Memory (CD-ROM) drive 522, a floppy disk drive 524, and a flash drive memory 526. The format of the ports connected to I/O interface 516 may be any known to those skilled in the art of computer architecture, including but not limited to Universal Serial Bus (USB) ports.

Service provider server 502 is able to communicate with client computer 402 via network 428 using a network interface 530, which is coupled to system bus 506. Access to network 428 allows service provider server 502 to execute and/or download GBDM 448 to client computer 402.

System bus 506 is also coupled to a hard drive interface 532, which interfaces with a hard drive 534. In a preferred embodiment, hard drive 534 populates a system memory 536, which is also coupled to system bus 506. Data that populates system memory 536 includes service provider server 502's operating system 538, which includes a shell 540 and a kernel 542. Shell 540 is incorporated in a higher level operating system layer and utilized for providing transparent user access to resources such as application programs 544, which include a browser 546, and a copy of GBDM 448 described above, which can be deployed to client computer 402.

The hardware elements depicted in service provider server 502 are not intended to be exhaustive, but rather are representative to highlight essential components required by the present invention. For instance, service provider server 502 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 502 performs all of the functions associated with the present invention (including execution of GBDM 448), thus freeing client computer 402 from using its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of GBDM 448, are performed by service provider server 502. Alternatively, GBDM 448 and the method described herein, and in particular as shown and described in FIGS. 2a-3c, can be deployed as a process software from service provider server 502 to client computer 402. Still more particularly, process software for the method so described may be deployed to service provider server 502 by another service provider server (not shown).

Figure 6A:
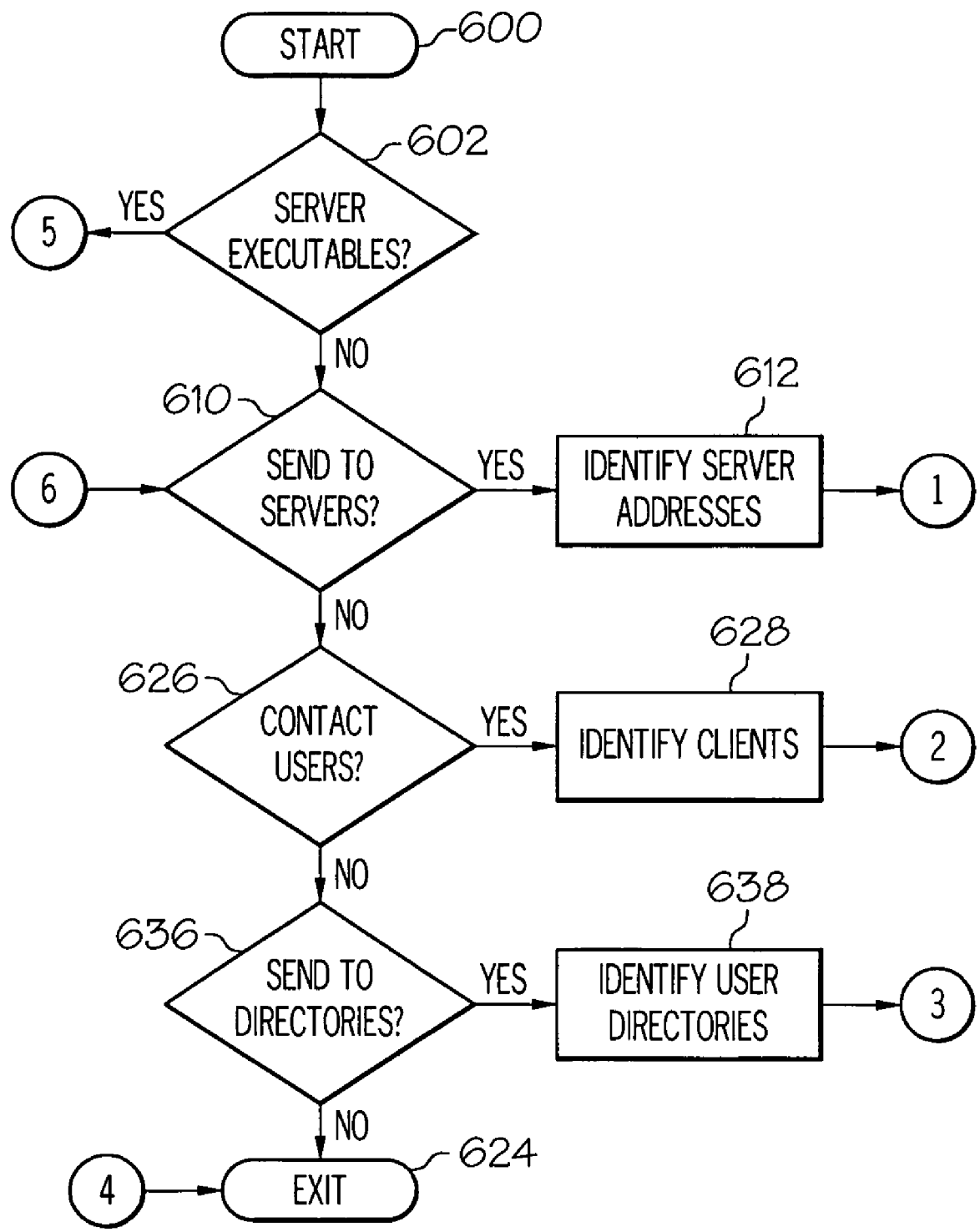
FIGS. 6a-b show a flow-chart of steps taken to deploy software capable of executing the steps shown and described in FIGS. 2a-3c.
Figure 6B:
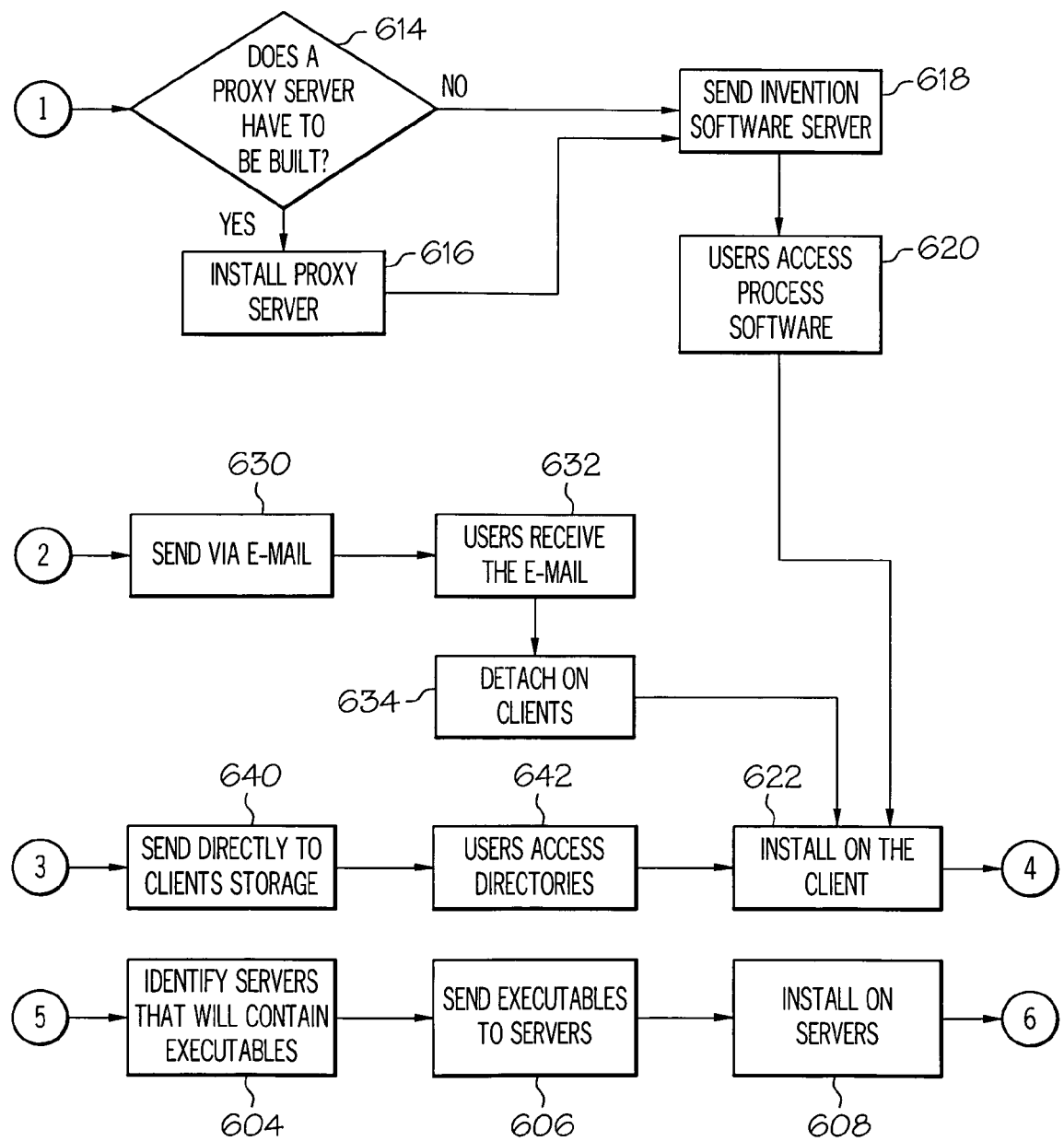

Referring then to FIG. 6, step 600 begins the deployment of the process software. The first thing is to determine if there are any programs that will reside on a server or servers when the process software is executed (query block 602). If this is the case, then the servers that will contain the executables are identified (block 604). The process software for the server or servers is transferred directly to the servers' storage via File Transfer Protocol (FTP) or some other protocol or by copying though the use of a shared file system (block 606). The process software is then installed on the servers (block 608).

Next, a determination is made on whether the process software is to be deployed by having users access the process software on a server or servers (query block 610). If the users are to access the process software on servers, then the server addresses that will store the process software are identified (block 612).

A determination is made if a proxy server is to be built (query block 614) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 618). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 620). Another embodiment is to have the servers automatically copy the process software to each client and then run the installation program for the process software at each client computer. The user executes the program that installs the process software on his client computer (block 622) then exits the process (terminator block 624).

In query step 626, a determination is made whether the process software is to be deployed by sending the process software to users via e-mail. The set of users where the process software will be deployed are identified together with the addresses of the user client computers (block 628). The process software is sent via e-mail to each of the users' client computers (block 630). The users then receive the e-mail (block 632) and then detach the process software from the e-mail to a directory on their client computers (block 634). The user executes the program that installs the process software on his client computer (block 622) then exits the process (terminator block 624).

Lastly a determination is made on whether to the process software will be sent directly to user directories on their client computers (query block 636). If so, the user directories are identified (block 638). The process software is transferred directly to the user's client computer directory (block 640). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 642). The user executes the program that installs the process software on his client computer (block 622) and then exits the process (terminator block 624).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process the of placing an entire packet within another packet and sending it over a network. The protocol of the outer packet is understood by the network and both points, called tunnel interfaces, where the packet enters and exits the network.

Figure 7A:
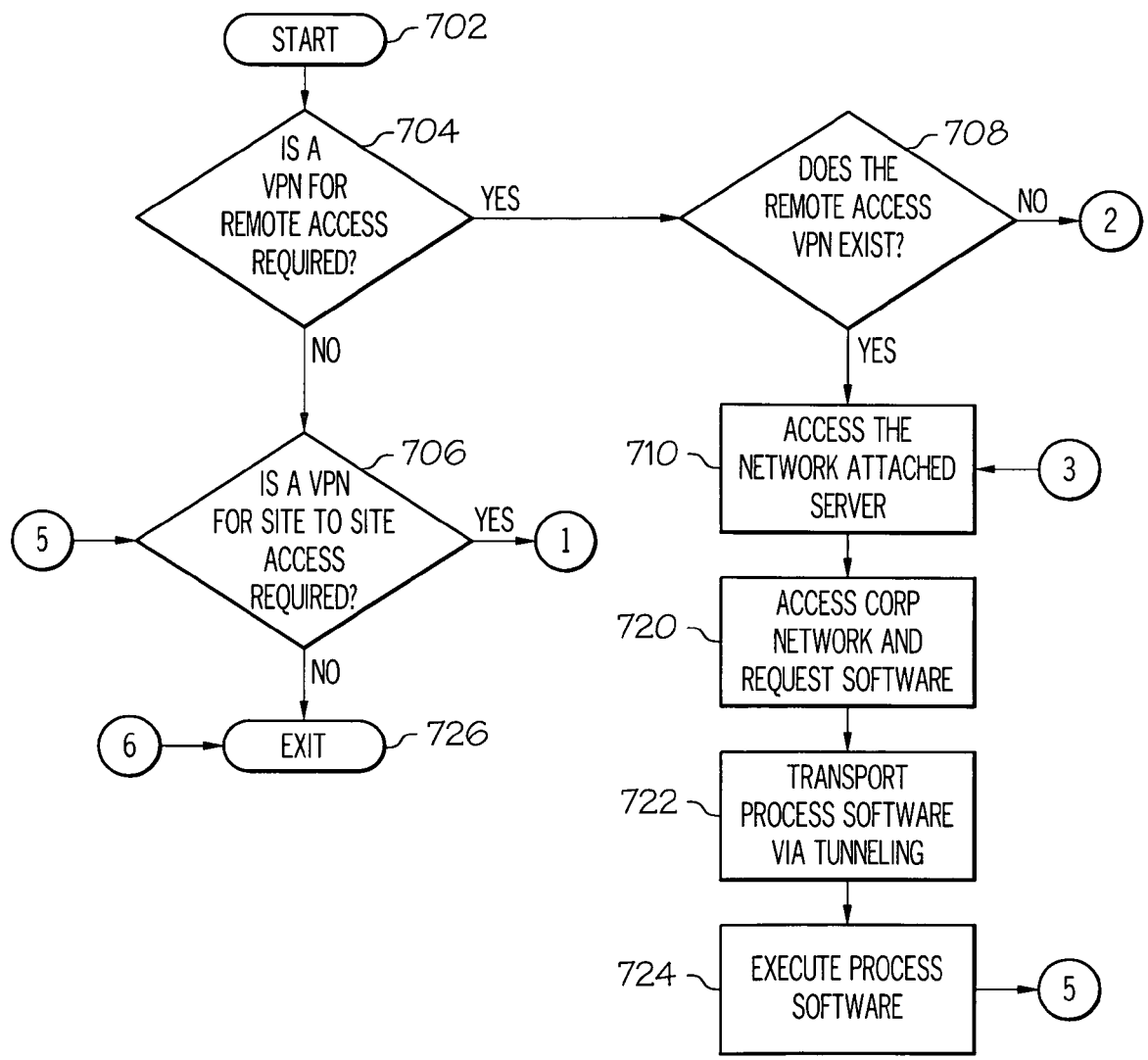
FIGS. 7a-c show a flow-chart of steps taken to deploy in a Virtual Private Network (VPN) software that is capable of executing the steps shown and described in FIGS. 2a-3c.
Figure 7B:
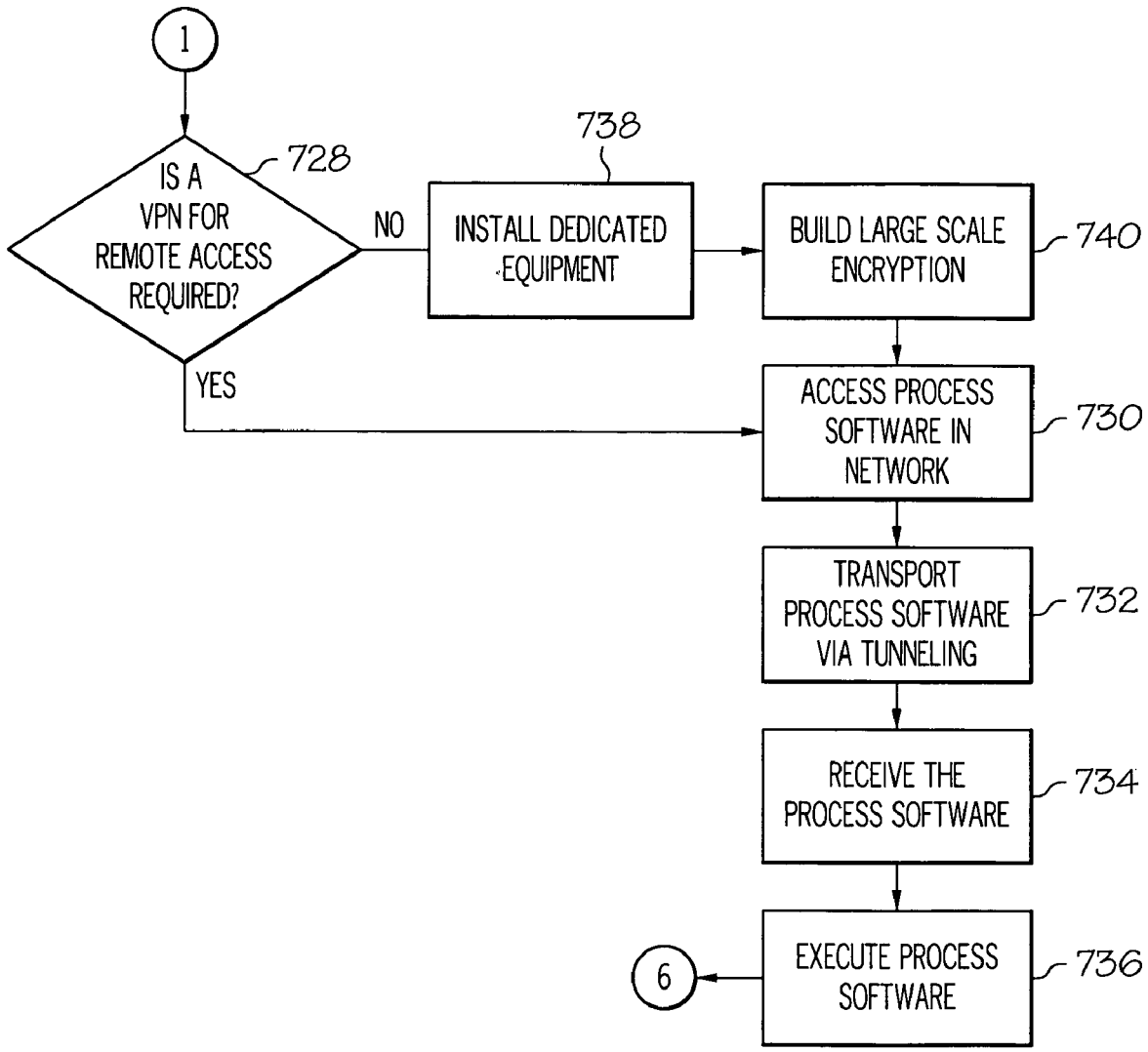
Figure 7C:
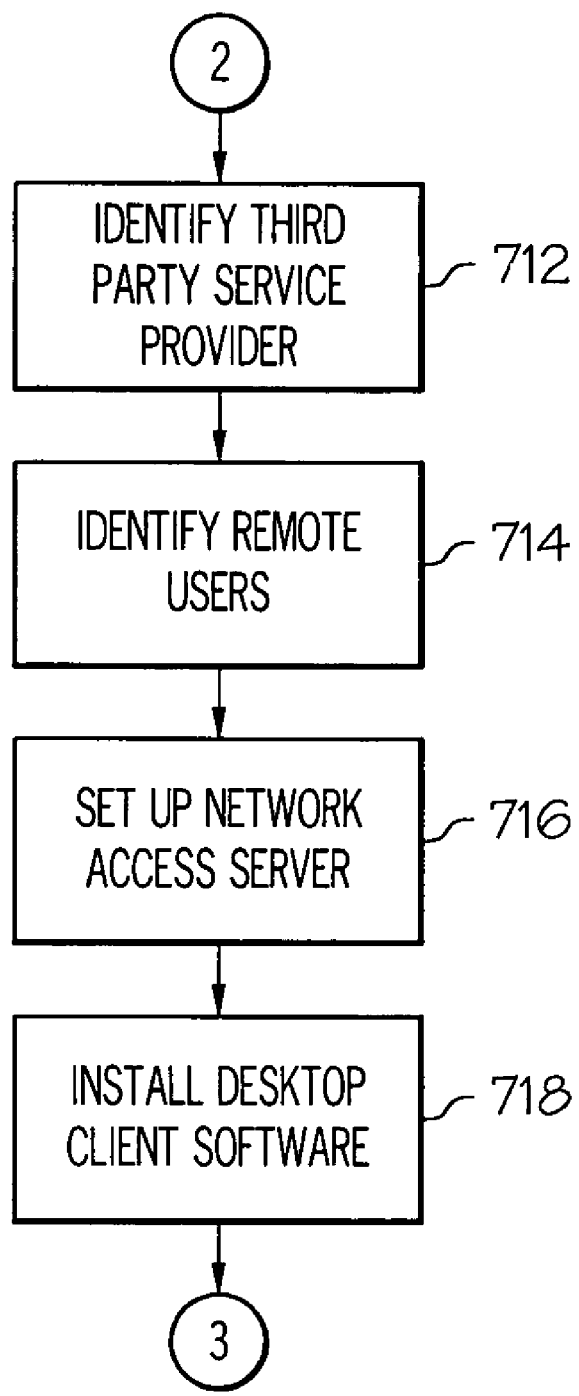

The process for such VPN deployment is described in FIG. 7. Initiator block 702 begins the Virtual Private Network (VPN) process. A determination is made to see if a VPN for remote access is required (query block 704). If it is not required, then proceed to (query block 706). If it is required, then determine if the remote access VPN exists (query block 708).

If a VPN does exist, then proceed to block 710. Otherwise identify a third party provider that will provide the secure, encrypted connections between the company's private network and the company's remote users (block 712). The company's remote users are identified (block 714). The third party provider then sets up a network access server (NAS) (block 716) that allows the remote users to dial a toll free number or attach directly via a broadband modem to access, download and install the desktop client software for the remote-access VPN (block 718).

After the remote access VPN has been built or if it been previously installed, the remote users can access the process software by dialing into the NAS or attaching directly via a cable or DSL modem into the NAS (block 710). This allows entry into the corporate network where the process software is accessed (block 720). The process software is transported to the remote user's desktop over the network via tunneling. That is the process software is divided into packets and each packet including the data and protocol is placed within another packet (block 722). When the process software arrives at the remote user's desk-top, it is removed from the packets, reconstituted and then is executed on the remote users desk-top (block 724).

A determination is then made to see if a VPN for site to site access is required (query block 706). If it is not required, then proceed to exit the process (terminator block 726). Otherwise, determine if the site to site VPN exists (query block 728). If it does exist, then proceed to block 730. Otherwise, install the dedicated equipment required to establish a site to site VPN (block 738). Then build the large scale encryption into the VPN (block 740).

After the site to site VPN has been built or if it had been previously established, the users access the process software via the VPN (block 730). The process software is transported to the site users over the network via tunneling (block 732). That is the process software is divided into packets and each packet including the data and protocol is placed within another packet (block 734). When the process software arrives at the remote user's desktop, it is removed from the packets, reconstituted and is executed on the site users desktop (block 736). The process then ends at terminator block 726.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 8A:
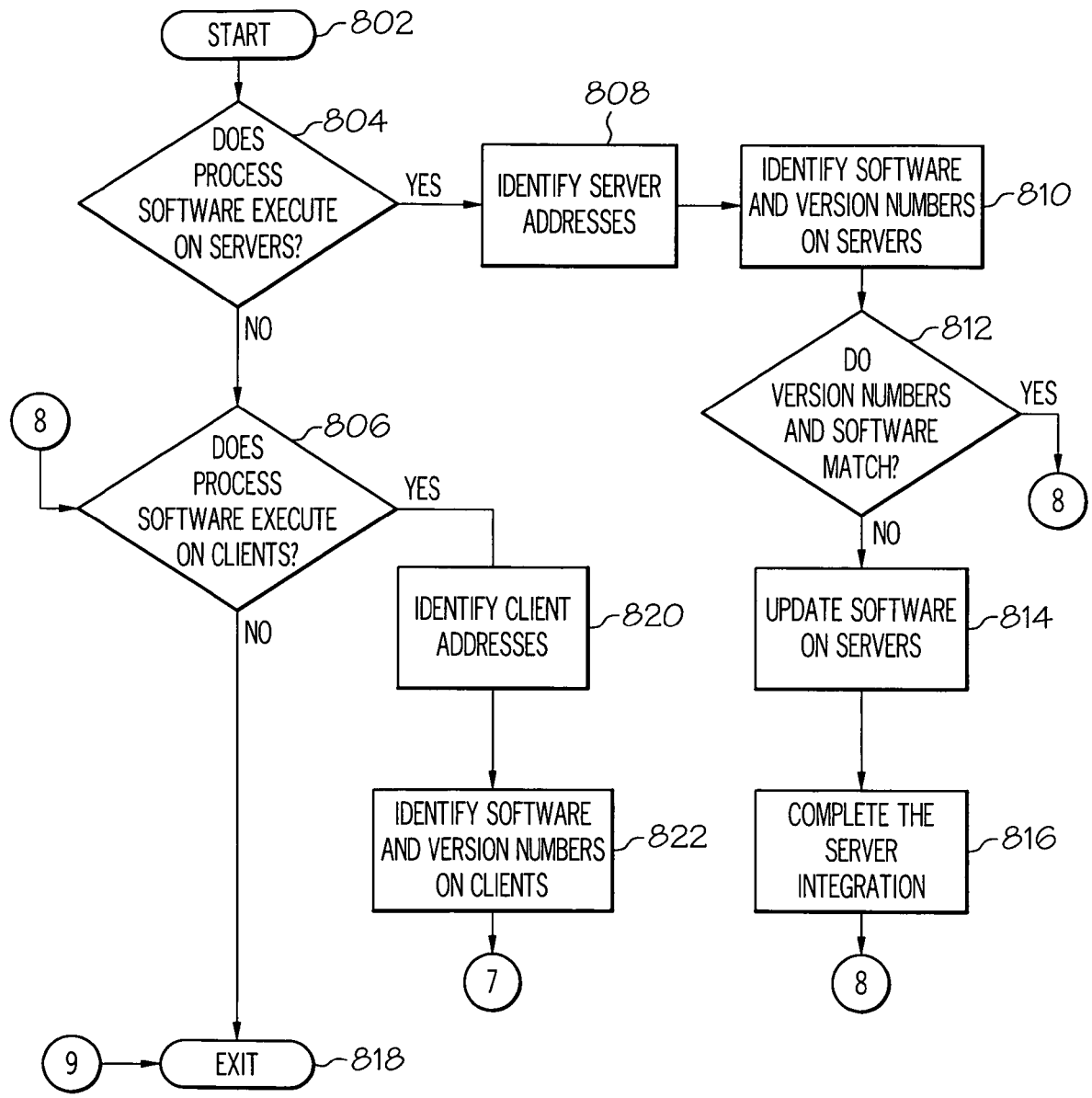
FIGS. 8a-b show a flow-chart showing steps taken to integrate into a computer system software that is capable of executing the steps shown and described in FIGS. 2a-3c.
Figure 8B:
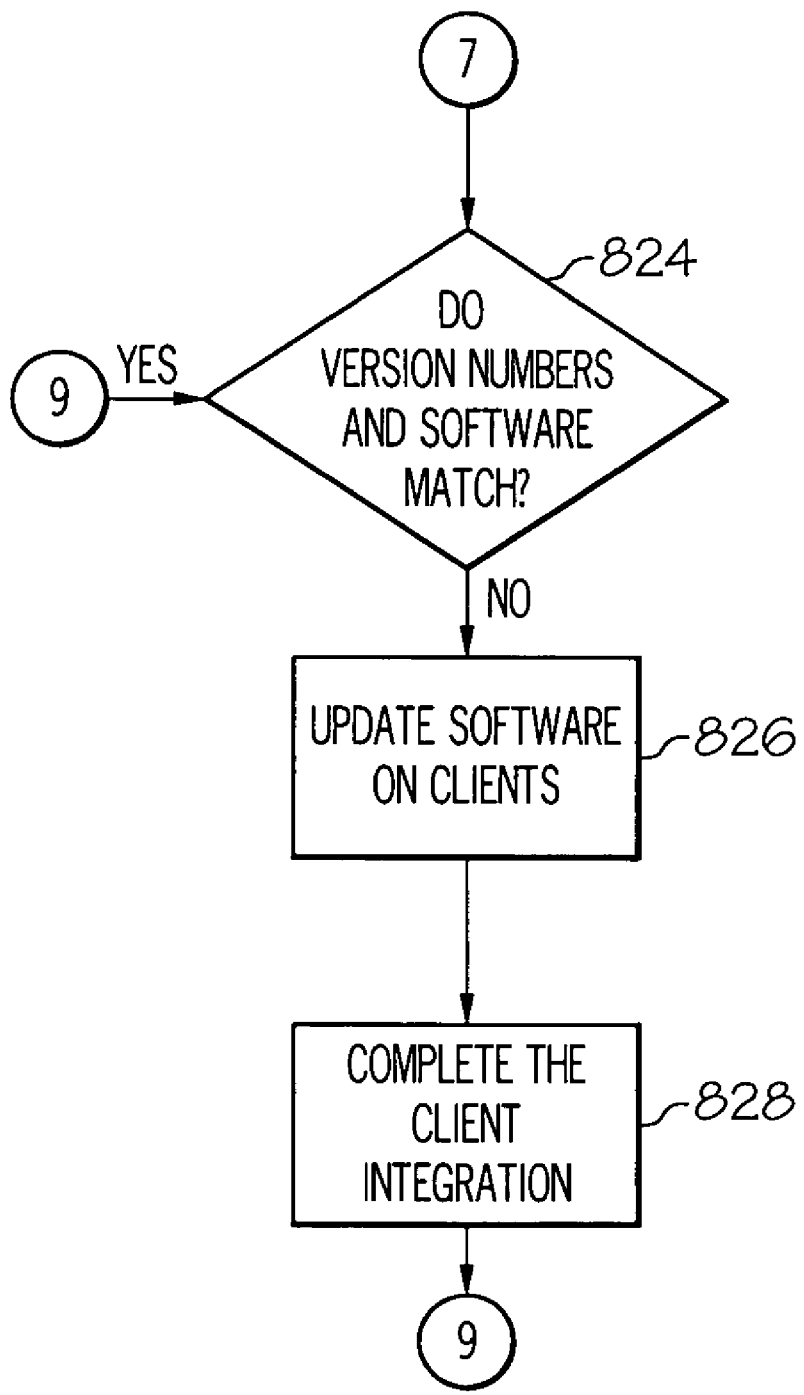

For a high-level description of this process, reference is now made to FIG. 8. Initiator block 802 begins the integration of the process software. The first tiling is to determine if there are any process software programs that will execute on a server or servers (block 804). If this is not the case, then integration proceeds to query block 806. If this is the case, then the server addresses are identified (block 808). The servers are checked to see if they contain software that includes the operating system (OS), applications, and network operating systems (NOS), together with their version numbers, which have been tested with the process software (block 810). The servers are also checked to determine if there is any missing software that is required by the process software in block 810.

A determination is made if the version numbers match the version numbers of OS, applications and NOS that have been tested with the process software (block 812). If all of the versions match and there is no missing required software the integration continues in query block 806.

If one or more of the version numbers do not match, then the unmatched versions are updated on the server or servers with the correct versions (block 814). Additionally, if there is missing required software, then it is updated on the server or servers in the step shown in block 814. The server integration is completed by installing the process software (block 816).

The step shown in query block 806, which follows either the steps shown in block 804, 812 or 816 determines if there are any programs of the process software that will execute on the clients. If no process software programs execute on the clients the integration proceeds to terminator block 818 and exits. If this not the case, then the client addresses are identified as shown in block 820.

The clients are checked to see if they contain software that includes the operating system (OS), applications, and network operating systems (NOS), together with their version numbers, which have been tested with the process software (block 822). The clients are also checked to determine if there is any missing software that is required by the process software in the step described by block 822.

A determination is made is the version numbers match the version numbers of OS, applications and NOS that have been tested with the process software (query block 824). If all of the versions match and there is no missing required software, then the integration proceeds to terminator block 818 and exits.

If one or more of the version numbers do not match, then the unmatched versions are updated on the clients with the correct versions (block 826). In addition, if there is missing required software then it is updated on the clients (also block 826). The client integration is completed by installing the process software on the clients (block 828). The integration proceeds to terminator block 818 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 9A:
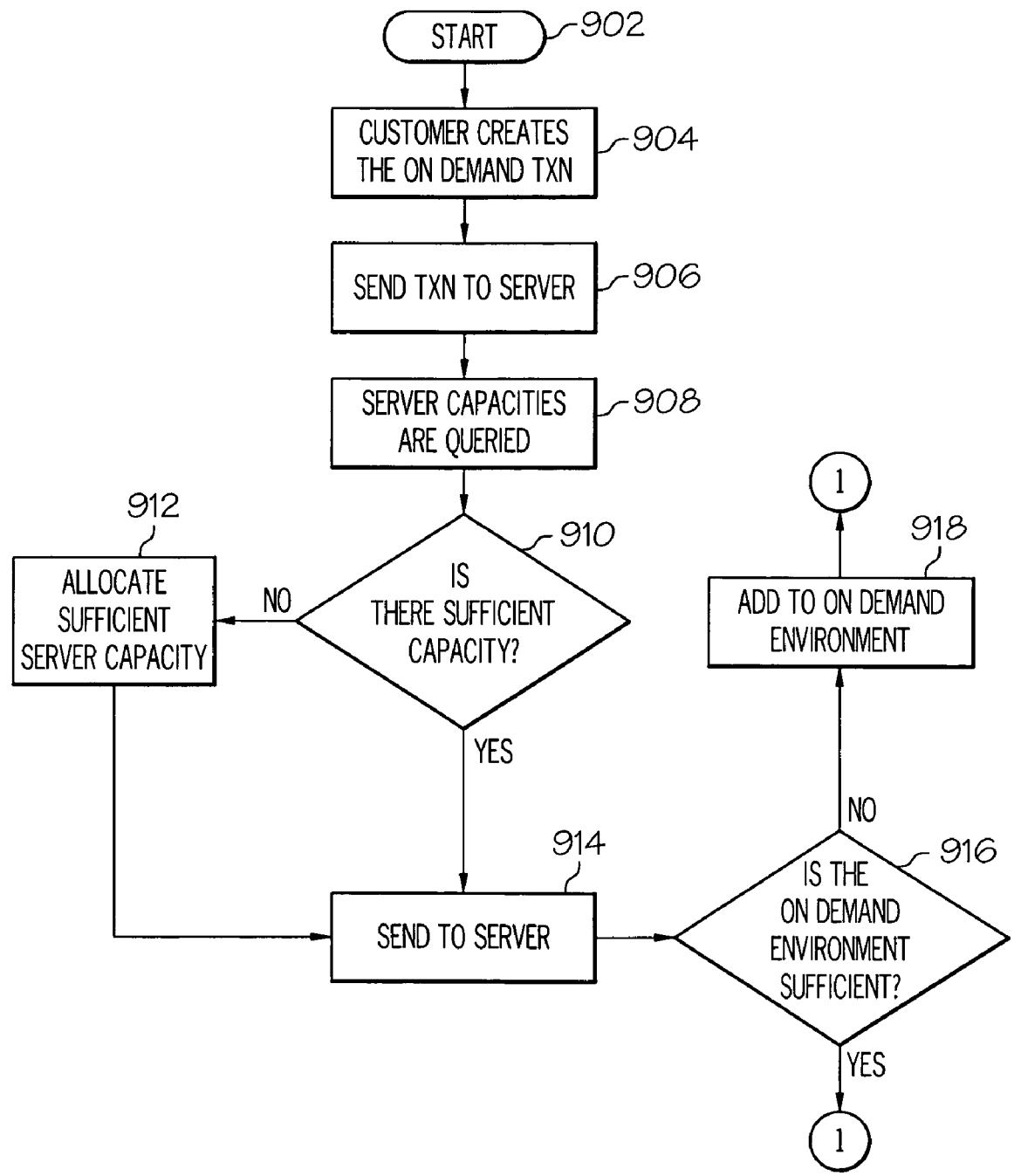
FIGS. 9a-b show a flow-chart showing steps taken to execute the steps shown and described in FIGS. 2a-3c using an on-demand service provider.
Figure 9B:
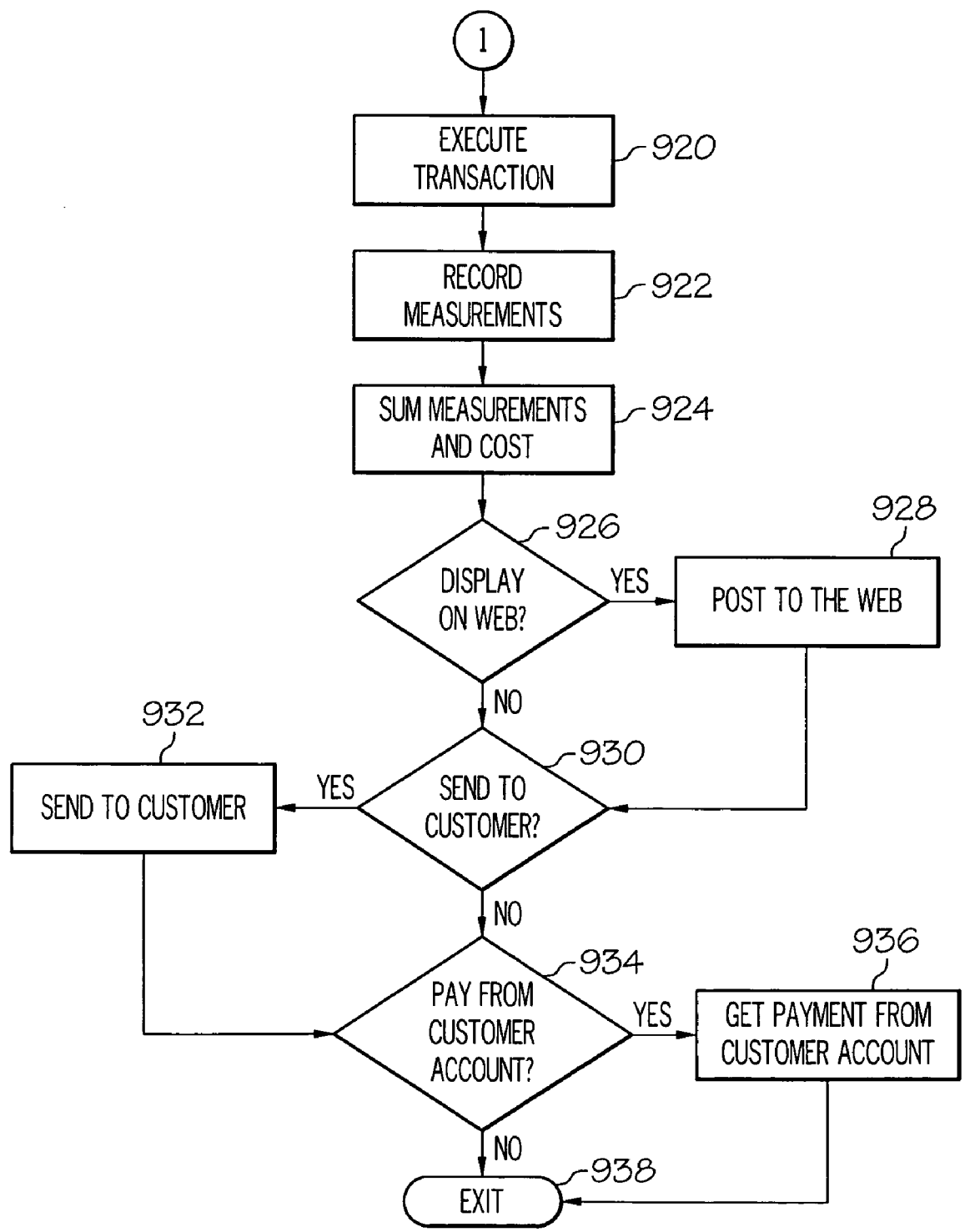

With reference now to FIG. 9, initiator block 902 begins the On Demand process. A transaction is created that contains the unique customer identification, the requested service type and any service parameters that further, specify the type of service (block 904). The transaction is then sent to the main server (block 906). In an On Demand environment the main server can initially be the only server, then as capacity is consumed other servers are added to the On Demand environment.

The server central processing unit (CPU) capacities in the On Demand environment are queried (block 908). The CPU requirement of the transaction is estimated, then the servers available CPU capacity in the On Demand environment are compared to the transaction CPU requirement to see if there is sufficient CPU available capacity in any server to process the transaction (query block 910). If there is not sufficient server CPU available capacity, then additional server CPU capacity is allocated to process the transaction (block 912). If there was already sufficient Available CPU capacity then the transaction is sent to a selected server (block 914).

Before executing the transaction, a check is made of the remaining On Demand environment to determine if the environment has sufficient available capacity for processing the transaction. This environment capacity consists of such things as but not limited to network bandwidth, processor memory, storage etc. (block 916). If there is not sufficient available capacity, then capacity will be added to the On Demand environment (block 918). Next the required software to process the transaction is accessed, loaded into memory, then the transaction is executed (block 920).

The usage measurements are recorded (block 922). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 924).

If the customer has requested that the On Demand costs be posted to a web site (query block 926), then they are posted (block 928). If the customer has requested that the On Demand costs be sent via e-mail to a customer address (query block 930), then these costs are sent to the customer (block 932). If the customer has requested that the On Demand costs be paid directly from a customer account (query block 934), then payment is received directly from the customer account (block 936). The On Demand process is then exited at terminator block 938.

The present invention thus presents a method, system, and computer-readable medium for managing graphical data. One embodiment of the invention allows users to visually set and monitor business targets on a time based continuum. Rather than toggling back and forth between an underlying spreadsheet and a graph that represents data from the spreadsheet, the present invention allows users to visually manipulate a chart of their business targets by dragging and dropping individual points (business targets), thus eliminating the need to reference and enter tabular data, and thus saving business users time and confusion.

Note that while zones have been depicted as being above, below, or within a target range, these zones can also be dynamically redefined on-the-fly. That is, by dragging an icon into a particular zone, that particular zone can be redefined. For example, by dragging a "red" icon into zone 204 shown in FIG. 2g, then zone 204 is now considered a "red" (undesirable) zone, rather than a "better than targeted" zone as previously described.

Similarly, while data has been described as being modified on the "y-axis," data can likewise be modified on the "x-axis," such as modifying target dates, etc.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implementable method comprising:
generating a graph on a Graphical User interface (GUI), wherein the graph includes a first line and a second line that are both straight lines, wherein the first line depicts expected production levels for an enterprise, wherein the first line and the second line define a green zone above the first line, a yellow zone between the first line and the second line, and a red zone below the second line, wherein the green zone defines a graphical zone for depicting an enterprise's database's data points that represent production figures that exceed the expected production levels, wherein the yellow zone defines a graphical zone for depicting the enterprise's database's data points that represent production figures that fall short of the expected production levels by a first pre-defined level, and wherein the red zone defines a graphical zone for depicting the enterprise's database's data points that represent production figures that fall short of the expected production levels by a second pre-defined level;

in response to detecting a hover of a cursor over a first particular point on the first line, magnifying the first particular point and presenting first underlying data from an enterprise's database at the first particular point on the first line, wherein the first underlying data is represented by the first particular point on the first line;

in response to detecting that the first particular point has been dragged by the cursor to a first new position on the GUI to create a new first particular point, automatically modifying a linear shape of the first line to create a modified first line, wherein the linear shape of the first line is modified to create the modified first line by adjusting a slope of the modified first line such that the modified first line leaves and then returns to an original slope of the first line;

in response to the linear shape of the first line being modified to create the modified first line, automatically adjusting modified first line datapoints, which are represented by the modified first line, in the enterprise's database such that the modified first line datapoints in the enterprise's database have values that are represented by the modified first line;

displaying, at the new first particular point on the modified first line, a first new value from the enterprise's database that is represented by the new first particular point;

in response to detecting a hover of the cursor over a second particular point on the second line, magnifying the second particular point and presenting second underlying data from the enterprise's database, wherein the second underlying data is represented by the second particular point on the second line;

in response to detecting that the second particular point has been dragged by the cursor to a second new position on the GUI to create a new second particular point, automatically modifying a linear shape of the second line to create a modified second line, wherein a shape of the modified second line is an arc;

in response to the shape of the second line being modified to create the modified second line, automatically adjusting second line datapoints, which are represented by the modified second line, in the enterprise's database such that adjusted second line datapoints in the enterprise's database have values that are represented by the modified second line;

displaying, at the new second particular point on the modified second line, a second new value from the enterprise's database that is represented by the new second particular point;

overlaying a real data track onto the graph, wherein the real data track is a line that represents actual production data, from the enterprise's database, for a current time period;

in response to detecting a hover of the cursor over a real production data point on the real data track, magnifying the real production data point and presenting, on the real data track, underlying data from the enterprise's database that is represented by the real production data point on the real data track;

in response to detecting that the real production data point has been dragged by the cursor to another position on the GUI to create a new real production data point, automatically modifying a shape of the real data track to create a modified real data track;

in response to the shape of the real data track being modified to create the modified real data track, automatically adjusting datapoints, which are represented by the modified real data track, in the enterprise's database;

displaying, at the new real production data point on the modified real data track, a new real data value represented by the new real production data point; and in response to new production data and new business conditions being detected, generating and displaying a predictive cone on the graph, wherein the predictive cone is generated using historical production trends, market intelligence, business intelligence, current real-time production performance, new contract data, new customer data, new store opening data, and new legal requirements and regulations that are all related to enterprise production operations, wherein the predictive cone represents a likely position of the real data track at a future time, wherein the real data track and the predictive cone enable a prediction as to whether future production levels will meet a target production level that is defined by the expected production levels for the enterprise.

2. A system comprising:

a processor;

a data bus coupled to the processor;

a memory coupled to the data bus; and a computer-usable storage medium embodying computer program code, the computer program code comprising instructions executable by the processor and configured for:

generating a graph on a Graphical User Interface (GUI), wherein the graph includes a first line and a second line that are both straight lines, wherein the first line depicts expected production levels for an enterprise, wherein the first line and the second line define a green zone above the first line, a yellow zone between the first line and the second line, and a red zone below the second line, wherein the green zone defines a graphical zone for depicting an enterprise's database's data points that represent production figures that exceed the expected production levels, wherein the yellow zone defines a graphical zone for depicting the enterprise's database's data points that represent production figures that fall short of the expected production levels by a first pre-defined level, and wherein the red zone defines a graphical zone for depicting the enterprise's database's data points that represent production figures that fall short of the expected production levels by a second pre-defined level;

in response to detecting a hover of a cursor over a first particular point on the first line, magnifying the first particular point and presenting first underlying data from an enterprise's database at the first particular point on the first line, wherein the first underlying data is represented by the first particular point on the first line;

in response to detecting that the first particular point has been dragged by the cursor to a first new position on the GUI to create a new first particular point, automatically modifying a linear shape of the first line to create a modified first line, wherein the linear shape of the first line is modified to create the modified first line by adjusting a slope of the modified first line such that the modified first line leaves and then returns to an original slope of the first line;

in response to the linear shape of the first line being modified to create the modified first line, automatically adjusting modified first line datapoints, which are represented by the modified first line, in the enterprise's database such that the modified first line datapoints in the enterprise's database have values that are represented by the modified first line;

displaying, at the new first particular point on the modified first line, a first new value from the enterprise's database that is represented by the new first particular point;

in response to detecting a hover of the cursor over a second particular point on the second line, magnifying the second particular point and presenting second underlying data from the enterprise's database, wherein the second underlying data is represented by the second particular point on the second line;

in response to detecting that the second particular point has been dragged by the cursor to a second new position on the GUI to create a new second particular point, automatically modifying a linear shape of the second line to create a modified second line, wherein a shape of the modified second line is an arc;

in response to the shape of the second line being modified to create the modified second line, automatically adjusting second line datapoints, which are represented by the modified second line, in the enterprise's database such that adjusted second line datapoints in the enterprise's database have values that are represented by the modified second line;

displaying, at the new second particular point on the modified second line, a second new value from the enterprise's database that is represented by the new second particular point;

overlaying a real data track onto the graph, wherein the real data track is a line that represents actual production data, from the enterprise's database, for a current time period;

in response to detecting a hover of the cursor over a real production data point on the real data track, magnifying the real production data point and presenting, on the real data track, underlying data from the enterprise's database that is represented by the real production data point on the real data track;

in response to detecting that the real production data point has been dragged by the cursor to another position on the GUI to create a new real production data point, automatically modifying a shape of the real data track to create a modified real data track;

in response to the shape of the real data track being modified to create the modified real data track, automatically adjusting datapoints, which are represented by the modified real data track, in the enterprise's database;

displaying, at the new real production data point on the modified real data track, a new real data value represented by the new real production data point; and in response to new production data and new business conditions being detected, generating and displaying a predictive cone on the graph, wherein the predictive cone is generated using historical production trends, market intelligence, business intelligence, current real-time production performance, new contract data, new customer data, new store opening data, and new legal requirements and regulations that are all related to enterprise production operations, wherein the predictive cone represents a likely position of the real data track at a future time, wherein the real data track and the predictive cone enable a prediction as to whether future production levels will meet a target production level that is defined by the expected production levels for the enterprise.

3. A computer-usable storage medium on which is stored computer program code, the computer program code comprising computer executable instructions configured for:

generating a graph on a Graphical User Interface (GUI), wherein the graph includes a first line and a second line that are both straight lines, wherein the first line depicts expected production levels for an enterprise, wherein the first line and the second line define a green zone above the first line, a yellow zone between the first line and the second line, and a red zone below the second line, wherein the green zone defines a graphical zone for depicting an enterprise's database's data points that represent production figures that exceed the expected production levels, wherein the yellow zone defines a graphical zone for depicting the enterprise's database's data points that represent production figures that fall short of the expected production levels by a first pre-defined level, and wherein the red zone defines a graphical zone for depicting the enterprise's database's data points that represent production figures that fall short of the expected production levels by a second pre-defined level;

in response to detecting a hover of a cursor over a first particular point on the first line, magnifying the first particular point and presenting first underlying data from an enterprise's database at the first particular point on the first line, wherein the first underlying data is represented by the first particular point on the first line;

in response to detecting that the first particular point has been dragged by the cursor to a first new position on the GUI to create a new first particular point, automatically modifying a linear shape of the first line to create a modified first line, wherein the linear shape of the first line is modified to create the modified first line by adjusting a slope of the modified first line such that the modified first line leaves and then returns to an original slope of the first line;

in response to the linear shape of the first line being modified to create the modified first line, automatically adjusting modified first line datapoints, which are represented by the modified first line, in the enterprise's database such that the modified first line datapoints in the enterprise's database have values that are represented by the modified first line;

displaying, at the new first particular point on the modified first line, a first new value from the enterprise's database that is represented by the new first particular point;

in response to detecting a hover of the cursor over a second particular point on the second line, magnifying the second particular point and presenting second underlying data from the enterprise's database, wherein the second underlying data is represented by the second particular point on the second line;

in response to detecting that the second particular point has been dragged by the cursor to a second new position on the GUI to create a new second particular point, automatically modifying a linear shape of the second line to create a modified second line, wherein a shape of the modified second line is an arc;

in response to the shape of the second line being modified to create the modified second line, automatically adjusting second line datapoints, which are represented by the modified second line, in the enterprise's database such that adjusted second line datapoints in the enterprise's database have values that are represented by the modified second line;

displaying, at the new second particular point on the modified second line, a second new value from the enterprise's database that is represented by the new second particular point;

overlaying a real data track onto the graph, wherein the real data track is a line that represents actual production data, from the enterprise's database, for a current time period;

in response to detecting a hover of the cursor over a real production data point on the real data track, magnifying the real production data point and presenting, on the real data track, underlying data from the enterprise's database that is represented by the real production data point on the real data track;

in response to detecting that the real production data point has been dragged by the cursor to another position on the GUI to create a new real production data point, automatically modifying a shape of the real data track to create a modified real data track;

in response to the shape of the real data track being modified to create the modified real data track, automatically adjusting datapoints, which are represented by the modified real data track, in the enterprise's database;

displaying, at the new real production data point on the modified real data track, a new real data value represented by the new real production data point; and in response to new production data and new business conditions being detected, generating and displaying a predictive cone on the graph, wherein the predictive cone is generated using historical production trends, market intelligence, business intelligence, current real-time production performance, new contract data, new customer data, new store opening data, and new legal requirements and regulations that are all related to enterprise production operations, wherein the predictive cone represents a likely position of the real data track at a future time, wherein the real data track and the predictive cone enable a prediction as to whether future production levels will meet a target production level that is defined by the expected production levels for the enterprise.

\* \* \* \* \*